United States Patent [19]

(12) United States Patent
Luschi et al.

(10) Patent No.: US 8,577,304 B2
(45) Date of Patent: *Nov. 5, 2013

(54) SYNCHRONOUS CDMA COMMUNICATION SYSTEM

(75) Inventors: Carlo Luschi, Oxford (GB); Steve Allpress, Bristol (GB); Philip Jones, Swindon (GB)

(73) Assignee: Icera, Inc., Wilmington, DE (US)

( * ) Notice: Subject to any disclaimer, the term of this patent is extended or adjusted under 35 U.S.C. 154(b) by 379 days.

This patent is subject to a terminal disclaimer.

(21) Appl. No.: 12/848,636

(22) Filed: Aug. 2, 2010

(65) Prior Publication Data

US 2011/0032837 A1 Feb. 10, 2011

Related U.S. Application Data

(63) Continuation-in-part of application No. 12/016,663, filed on Jan. 18, 2008, now Pat. No. 8,126,451, and a continuation-in-part of application No. 12/016,629, filed on Jan. 18, 2008.

(30) Foreign Application Priority Data

Oct. 31, 2007 (GB) .................................. 0721423.2
Oct. 31, 2007 (GB) .................................. 0721426.5
Jan. 29, 2010 (GB) .................................. 1001482.7

(51) Int. Cl.
*H04B 7/00* (2006.01)

(52) U.S. Cl.
USPC .............. 455/70; 455/69; 455/522; 455/63.1; 455/67.11; 455/423; 370/252; 370/324

(58) Field of Classification Search
USPC .......... 370/252, 335, 350; 455/423, 446, 448, 455/63.1, 67.11, 67.13, 114.2, 296, 522, 69, 455/450–452.2

See application file for complete search history.

(56) References Cited

U.S. PATENT DOCUMENTS

| | | | | |
|---|---|---|---|---|
| 5,790,606 A | * | 8/1998 | Dent | 375/348 |
| 5,893,035 A | * | 4/1999 | Chen | 455/522 |
| 6,151,484 A | * | 11/2000 | Ramesh | 455/68 |
| 6,393,277 B1 | * | 5/2002 | Sahin et al. | 455/423 |

(Continued)

FOREIGN PATENT DOCUMENTS

| | | |
|---|---|---|
| EP | 1921757 A1 | 5/2008 |
| WO | 9908460 A2 | 2/1999 |
| WO | 0223742 A2 | 3/2002 |
| WO | 2007091908 A1 | 8/2007 |

OTHER PUBLICATIONS

Environment-Adaptive Receiver: A Performance Prediction Approach; pp. 5709-5714; IEEE 2006.

(Continued)

*Primary Examiner* — Sharad Rampuria

(57) ABSTRACT

In one aspect, there is provided a method of processing a signal received using a wireless communication channel by a receiver in a wireless cellular network. In one embodiment, the method comprises receiving signal samples of a signal to be processed from a serving cell, identifying a second of dominant interfering cells generating an interfering signal, using a number of cells in the set to select an interference scenario, and using the selected interference scenario and at least one parameter related to the serving cell and the interfering cells to select a processing function for processing the signal.

27 Claims, 14 Drawing Sheets

(56) References Cited

U.S. PATENT DOCUMENTS

| | | | |
|---|---|---|---|
| 6,889,056 B2* | 5/2005 | Shibutani | 455/522 |
| 7,079,812 B2* | 7/2006 | Miller et al. | 455/63.1 |
| 7,437,177 B2* | 10/2008 | Ozluturk et al. | 455/522 |
| 7,689,240 B2* | 3/2010 | Anderson | 455/522 |
| 8,189,653 B2* | 5/2012 | Luschi et al. | 375/232 |
| 8,285,216 B2* | 10/2012 | Malladi et al. | 455/63.1 |
| 2002/0027957 A1* | 3/2002 | Paulraj et al. | 375/267 |
| 2002/0105928 A1 | 8/2002 | Kapoor et al. | |
| 2002/0110205 A1* | 8/2002 | Piirainen | 375/346 |
| 2005/0089089 A1* | 4/2005 | Anim-Appiah et al. | 375/232 |
| 2005/0164644 A1* | 7/2005 | Shinoi et al. | 455/69 |
| 2005/0277425 A1 | 12/2005 | Niemela et al. | |
| 2008/0165904 A1* | 7/2008 | Sidi et al. | 375/345 |
| 2009/0316591 A1* | 12/2009 | Reial et al. | 370/252 |
| 2010/0008244 A1 | 1/2010 | Sampath et al. | |

OTHER PUBLICATIONS

Average Orthogonality Factor in WCDMA Downlinks for Independent Rayleigh Fading Multipath Channels; pp. 1213-1217; IEEE 2007.

Characterizing the Orthogonality Factor in WCDMA Downlinks; pp. 621-625; IEEE 2003.

* cited by examiner

SYNCHRONOUS CDMA COMMUNICATION SYSTEM

CROSS-REFERENCE TO RELATED APPLICATIONS

This Application is a continuation-in-part of U.S. application Ser. No. 12/016,629 filed on Jan. 18, 2008; entitled "RADIO RECEIVER IN A WIRELESS COMMUNICATIONS SYSTEM" which claims priority from GB 0721426.5 filed on Oct. 31, 2007 and of U.S. application Ser. No. 12/016,663 filed on Jan. 18, 2008 entitled "SYNCHRONOUS CDMA COMMUNICATION SYSTEM" which claims priority from GB 0721423.2 filed on Oct. 31, 2007. This application also claims priority from GB 1001482.7 filed on Jan. 29, 2010. The above filed applications are commonly assigned with the present invention and incorporated herein by reference in their entirety.

TECHNICAL FIELD

This invention relates to a cellular communications system, particularly but not exclusively a synchronous Code Division Multiple Access (CDMA) system.

BACKGROUND

As is well known, a cellular communications system includes mobile radio receiver devices which can communicate with each other via base stations in the system. The system is set up as a cellular network, with each base station serving one or more cells depending on the cell structure. The mobile radio receiver devices include analog radio frequency (RF)/intermediate frequency (IF) stages which are arranged to receive and transmit wireless signals carrying data via one or more antennas. The output of the RF/IF stages is typically converted to baseband, where an analog to digital converter (ADC) converts incoming analog signals to digital samples, which are then processed for signal detection and decoding of the data, e.g., in the form of logical values. The analog to digital converter may alternatively operate directly at IF, in which case the conversion to baseband is performed in the digital domain. A number of different types of front end processing of the digital samples are known to implement signal detection, including rake receiver processing and channel equalization processing.

In code division multiple access wireless systems, different physical channels are multiplexed in the code domain using separate spreading sequences. In the case of orthogonal spreading code words, the original data symbols can then be effectively separated at the receiver by despreading. In a wideband CDMA (WCDMA) cellular system, downlink code multiplexing is performed using orthogonal variable spreading factor (OVSF) codes. However, the OVSF code words are orthogonal to each other only under the condition of perfect time alignment. In the presence of multi-path propagation, the code orthogonality is lost and the operation of despreading is effected by multiple access interference (MAI).

Conventional CDMA receivers based on rake processing (as described for example in J. G. Proakis, "Digital Communications", published by McGraw & Hill, 1995) are subject to performance degradation due to loss of orthogonality between channelization codes in the presence of multi-path propagation. For synchronous CDMA transmission, as in the case of the forward link of the third generation partnership project (3GPP) WCDMA standard, an effective approach to solve this problem is to use a chip level channel equalizer (for example as described in the paper by A. Klein "Data Detection Algorithms Specially Designed for the Downlink of CDMA Mobile Radio Systems", in Proceedings of IEEE Vehicular Technology Conference, vol. 1, Phoenix, Ariz., May 1997, pp. 203-207). The use of channel equalization processing generally produces a significant performance advantage over conventional rake processing, but at the cost of an increased implementation complexity.

The performance advantage provided by chip level equalization is especially important for high data rate transmission, as in the case of the 3GPP high speed downlink packet access (HSDPA) standard.

The computation of the equalizer coefficients for implementing equalizer processing can be based on the minimization of the Mean-Square Error (MSE) at the equalizer output. In principle, this can be achieved by block processing, as mentioned for example in A. Klein, "Data Detection Algorithms Specially Designed for the Downlink of CDMA Mobile Radio Systems", in Proceedings of IEEE Vehicular Technology Conference, vol. 1, Phoenix, Ariz., May 1997, pp. 203-207, or by means of an adaptive algorithm as mentioned in K. Hooli, M. Latva-aho and M. Juntti, "Performance Evaluation of Adaptive Chip-Level Channel Equalizers in WCDMA Downlink", in Proceedings of IEEE International Conference on Communications, vol. 6, Helsinki, Finland, June 2001, pp. 1974-1979. In the case of a synchronous CDMA receiver, the application of adaptive processing based on, e.g., a Normalized Least Mean-Square (NLMS) updating rule of the equalizer coefficients suffers from the non-orthogonality of the downlink codes in the presence of multipath. This results in a relatively large error signal, which requires a small adaptation step size to provide sufficient averaging, and hence slows down convergence as discussed in Hooli, et al., above.

Channel equalization may not be able to provide superior performance at low signal to interference-plus-noise ratios. One aim of the present invention is to provide a technique for estimation of the wireless receiver operating conditions, which is useful to establish whether it is better to perform rake processing or equalizer processing.

With respect to the calculation of the equalizer coefficients, the conventional MMSE criterion has the disadvantage of relying on specific assumptions on the statistics of the input disturbance (noise-plus-interference). An HSDPA MMSE equalizer typically assumes that the inter-cell interference can be modeled as an Additive White Gaussian Noise (AWGN) process. From this point of view, a more robust approach is to compute the equalizer coefficients based the Least-Squares (LS) criterion, where the calculation of the equalizer coefficients relies directly on the sample statistics of the input signal, without making any assumption on the statistics of the interference, as discussed, for example, in S. Haykin, *Adaptive Filter Theory*, Upper Saddle River, N.J.: Prentice Hall, 2001.

For both MMSE and LS equalizers, the processing relies on input signal samples collected from a suitable time interval, which should be selected in order to realize the best trade-off between the conflicting requirements of reducing the estimation errors by averaging over a wider time window, and of tracking the time variations of the propagation channel by averaging over a narrower time window for higher mobile speed.

Another aim of the present invention is to provide a robust interference scenario selection mechanism which can be used to more accurately adapt wireless receivers to certain channel environments.

A more general aim of the invention is to provide a robust estimation technique for providing information about signal-to-disturbance ratios in a wireless network.

SUMMARY

In one aspect, there is provided a method of processing a signal received using a wireless communication channel by a receiver in a wireless cellular network. In one embodiment, the method comprises receiving signal samples of a signal to be processed from a serving cell, identifying a second of dominant interfering cells generating an interfering signal, using a number of cells in the set to select an interference scenario, and using the selected interference scenario and at least one parameter related to the serving cell and the interfering cells to select a processing function for processing the signal.

In another aspect, there is provided a receiver for use in a wireless cellular network for processing digital samples. In one embodiment the receiver comprises a means for receiving signal samples, means for identifying a set of dominant interfering cells generating an interfering signal above a level, means for selecting an interference scenario using a number of cells in the set, and a means for selecting a processing function for processing the digital samples based on the selected interference scenario and at least one parameter related to a serving cell and the interfering cells.

In another aspect, there is provided a receiver for use in a wireless cellular network for processing digital samples. In one embodiment, the receiver comprises a processor and a memory. The processor is arranged to receive a sequence of digital samples corresponding to symbols transmitted in a cell of the wireless network. The processor implements an interference scenario selection routine which uses an identified set of dominant interfering cells above signal level to select the interference scenario. The processor is further operable to implement one of a plurality of processing routines for processing the digital samples. The memory holds the plurality of processing routines. The processor implements a selection routine which uses the selected interfering scenario to select one of the plurality of processing routines in the memory for processing the digital samples.

In another aspect, there is provided a method of processing digital samples in a cellular network. In one embodiment, the method comprises receiving a sequence of samples corresponding to symbols transmitted in a signal in a cell of the wireless network, using the received sequence to generate an estimate of cell geometry, and using the estimate to select one of a plurality of processing routines for processing the digital samples. The estimate is an estimate of a ratio between received signal power of signals of that cell and disturbance power where disturbance power is a measure of disturbance introduced from signals of other cells and noise.

In yet another aspect, there is provided a receiver for use in a wireless cellular network for processing digital samples. In one embodiment, the receiver comprises a processor arranged to receive a sequence of digital samples corresponding to symbols transmitted in a cell of the wireless network and a memory. The processor implements an estimation routine which uses the received sequence to generate an estimate of a ratio between received signal power of signals of that cell and disturbance power where disturbance power is a measure of disturbance introduced from signals of other cells and noise and one of a plurality of processing routines for processing the digital samples. The memory holds the plurality of processing routines. The processing implements a routine which uses the estimate to select one of the plurality of processing routines in the memory for processing the digital samples.

In yet another aspect, there is provided a method of processing radio communication signals in a radio receiver. In one embodiment, the method comprises receiving digital samples of an incoming radio communication signal and processing those samples in accordance with an equalizer algorithm, estimating at least one parameter of a channel over which the incoming signal has been transmitted, and selecting the equalizer algorithm from a plurality of equalizer algorithms based on at least one estimated channel parameter. The plurality of equalizer algorithms include algorithms with different equalizer cost functions and the step of selecting the equalizer algorithm comprises selecting one of the different equalizer cost functions. The step of selecting one of the equalizer cost functions is based on a parameter indicative of a signal to disturbance ration.

In yet another aspect, there is provided a method of processing radio communication signals in a radio receiver. In one embodiment, the method comprises receiving digital samples of an incoming radio communication signal and processing those samples in accordance with an equalizer algorithm, estimating at least one parameter of a channel over which the incoming signal has been transmitted, and selecting an equalizer algorithm from a plurality of equalizer algorithms based on at least one estimated channel parameter. The plurality of equalizer algorithms include algorithms with different equalizer cost functions and the step of selecting the equalizer algorithm comprises selecting one of the different cost functions. The step of selecting one of the equalizer cost functions is based on a channel parameter indicative of statistical distribution of disturbance.

BRIEF DESCRIPTION

Reference is now made to the following descriptions taken in conjunction with the accompanying drawings, in which.

DETAILED DESCRIPTION

Those skilled in the art to which this application relates will appreciate that other and further additions, deletions, substitutions and modifications may be made to the described embodiments.

Figure 1:
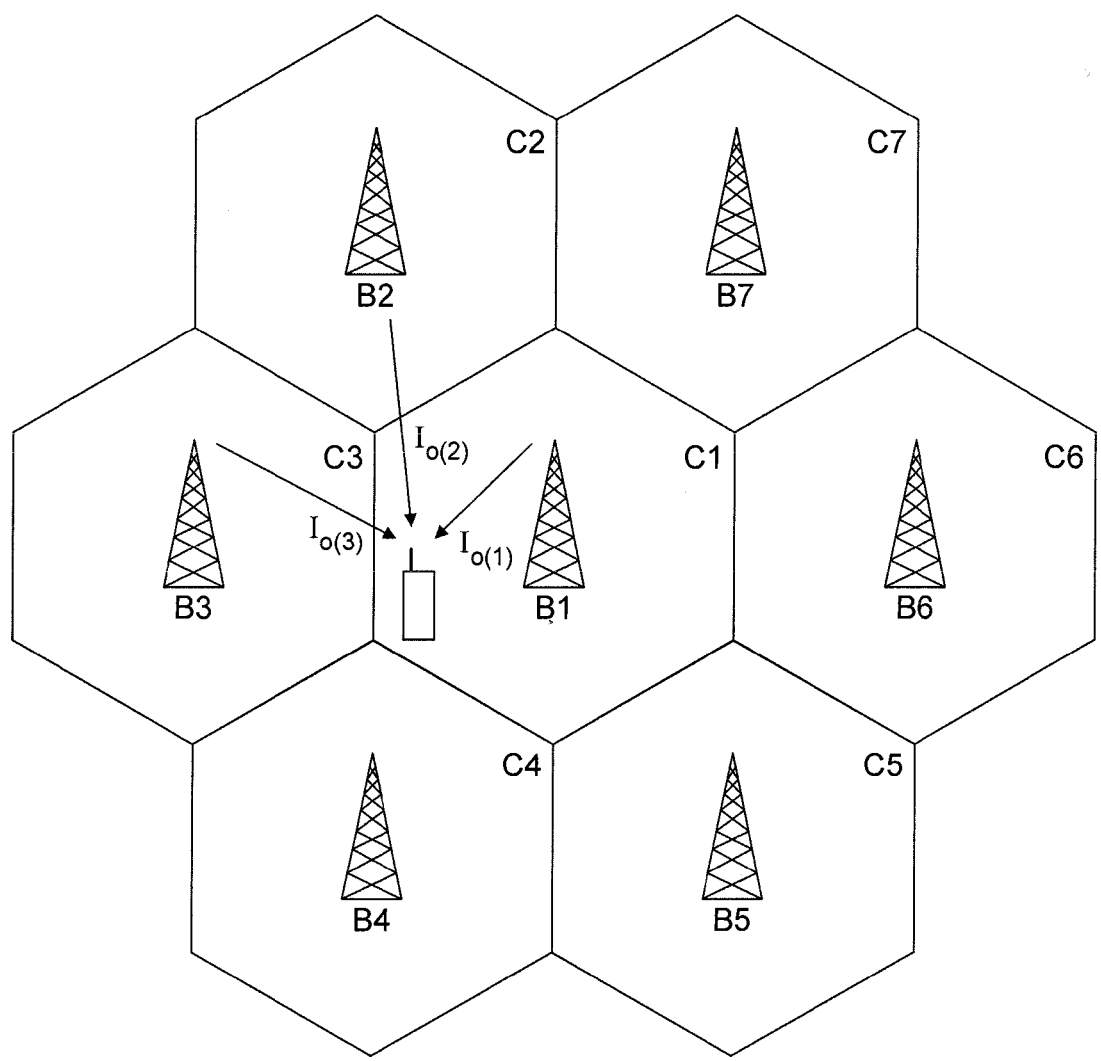
FIG. 1 is a schematic diagram of a wireless cellular network.

FIG. 1 is a schematic diagram of a wireless cellular network. A plurality of adjacent cells are illustrated, shown as being hexagonal but it will be readily appreciated that they could be of any shape. A base station B1 is shown serving cell C1 and potentially interfering with cells C2, C3, . . . , C7, served by base stations B2, B3, . . . , B7, respectively. It will readily be appreciated that there can be a large plurality of base stations and cells, and that base stations can serve any number of cells (including one).

A mobile terminal user equipment UE is shown in cell C1. As is well known, the UE has a transmitter and a receiver for wireless signals. The main signal which the UE is intending to receive is labeled $I_{o(1)}$ to represent the downlink channels from the base station B1. In a WCDMA system, on a given cell, different physical channels are multiplexed in the code domain using separate spreading sequences (OVFS codes as described for example in the 3GPP specification "Technical Specification Group Radio Access Network; Spreading and Modulation (FDD)", TS 25.213, March 2006). In the case of orthogonal spreading code words, the original data symbols can then be effectively separated at the receiver by despreading. The composite signal transmitted from the base station B1 consists of the superposition of these physical channels further modified by multiplication by a pseudo-random scrambling code, which is unique (at least locally) to the cell. This composite signal is received at the user equipment UE after passing through a transmission channel which, if significant multipath components are present, results in a loss of orthogonality that produces multiple-access interference (MAI). The received signal is further corrupted by the addition of thermal noise and transmissions from other cells (for example $I_{o(2)}$ and $I_{o(3)}$). Due to lack of synchronization and use of different scrambling codes, these interfering signals are not orthogonal to the wanted cell transmissions.

In the following, we denote by $I_{or}$ the total transmit downlink power of the wanted cell at the base station and define $\hat{I}_{or}=\sigma_d^2$ the received downlink power of the wanted cell at the UE, and $I_{oc}=\sigma_n^2$ the received power of the interfering cells plus thermal noise at the UE.

Each cell in the wideband CDMA system transmits a special constant power downlink channel known as the common pilot channel (CPIPH) on a fixed OVSF code (as discussed for example in the 3GPP specification "Technical Specification Group Radio Access Network; Physical Channels and Mapping of Transport Channels onto Physical Channels (FDD)", TS 25.211, December 2005). The CPICH is transmitted with a fixed, predetermined data pattern and can be used for channel estimation and signal-to-interference ratio (SIR) estimation.

Figure 2:
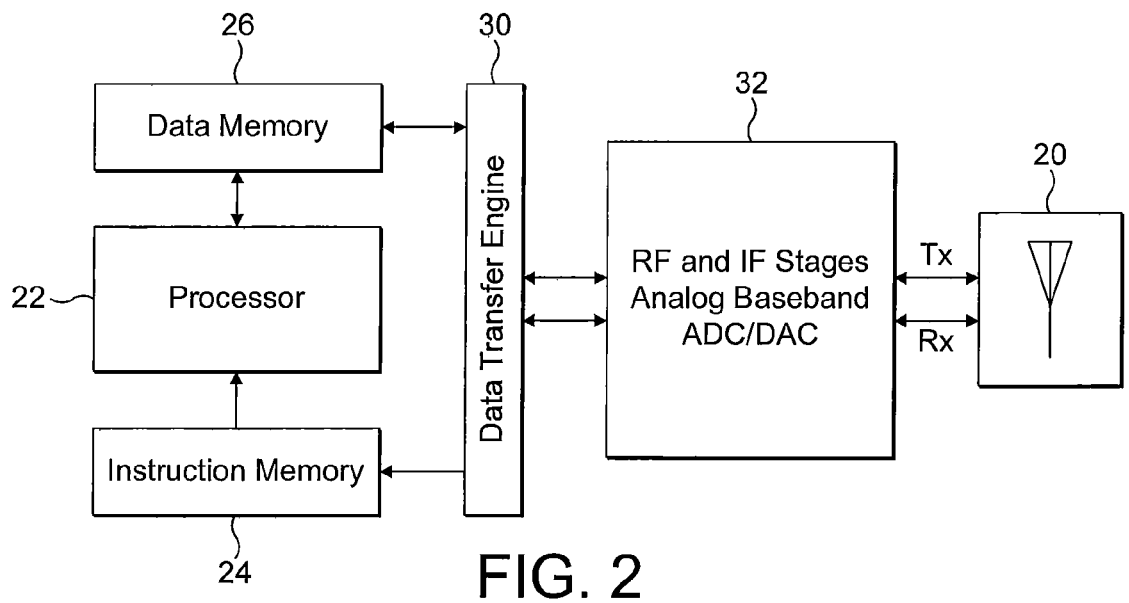
FIG. 2 is a schematic block diagram of a wireless communications device.

FIG. 2 is a schematic block diagram of a device for transmitting and receiving signals in a wireless communications system. Such a device can be implemented in a number of different ways, but in accordance with FIG. 2 a series of RF/IF stages 32 is arranged to receive and transmit wireless signals (TX, RX) via one or more antennas 20. The embodiments of the present invention discussed herein are principally concerned with receiving wireless signals, and so that transmit signals will not be mentioned further. The received signal at the output of the RF/IF stages is typically converted to baseband, where an ADC converts the analog signal into digital samples. The block 32 of FIG. 2 includes components for processing the received radio signals and providing digital signal samples r(k). This can be achieved in different ways, which are known in the art and which are not discussed further herein.

The samples r(k) are supplied to a data transfer engine 30 which communicates with a processor 22, an instruction memory 24 and a data memory 26. The processor 22 is responsible for processing the samples r(k). The processor 22 can execute a number of different functions which are held in an instruction memory 24 in the form of code sequences. This provides a so-called soft modem which has a number of advantages discussed further herein.

Figure 3:
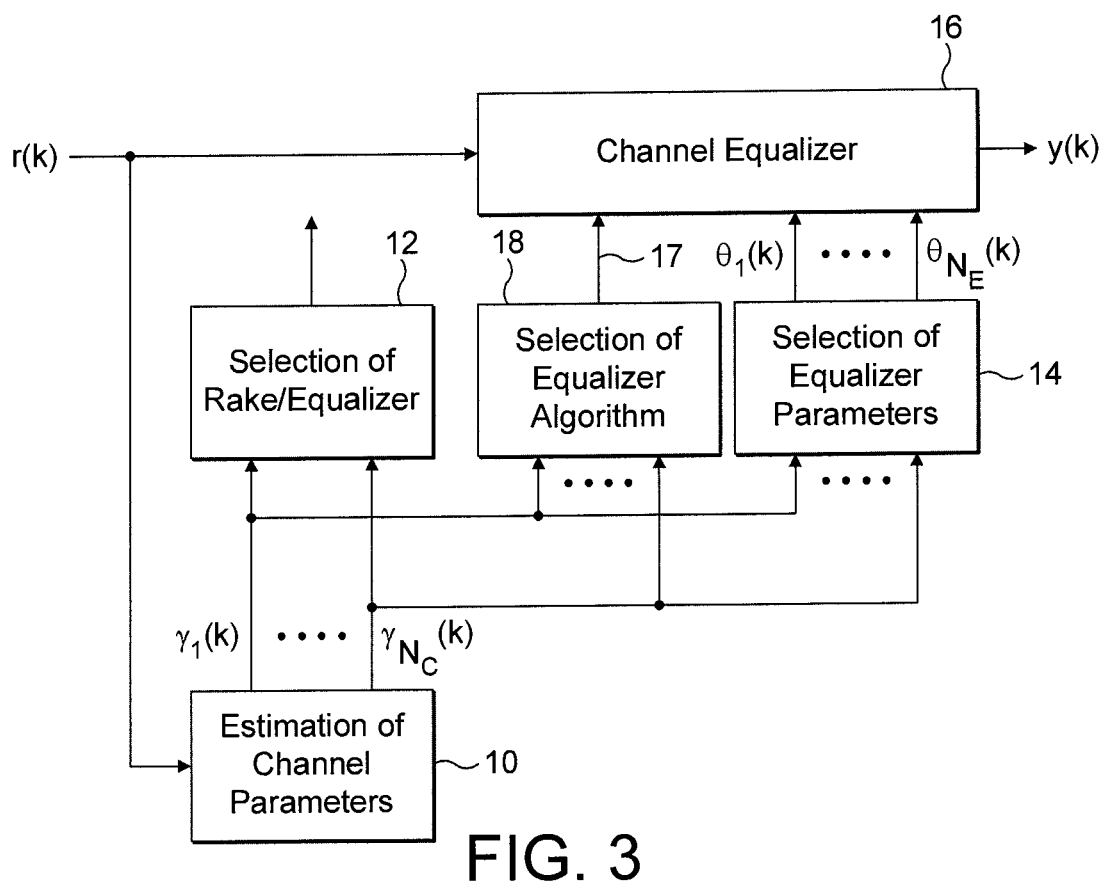
FIG. 3 is a schematic block diagram of processing functions.

FIG. 3 is a schematic block diagram which illustrates some among a number of different functions that are executed by the processor 22. A first function denoted by block 10 is referred to as estimation of channel parameters. This function estimates a number of different parameters related to the communication channels over which the radio signals are transmitted in the wireless communication system. The function provides at time k the outputs $\gamma_n(k)$, n=1, . . . , $N_C$, where $N_C$ denotes the number of estimated channel parameters, that represent a set of channel parameters derived from the received signal samples r(k). The estimated channel parameters $\gamma_n(k)$ can be used for a number of different purposes. As illustrated in FIG. 3, they are supplied to a Selection of Rake/Equalizer Receiver function 12 which determines whether to process the received samples using a rake receiver or an equalizer receiver. The rake receiver or equalizer receiver is implemented by the processor 22 executing the appropriate code sequence from the instruction memory 24.

The parameters $\gamma_n(k)$ are further supplied to a Selection of Equalizer Algorithm function 18 which is used in the event that a channel equalizer 16 is selected. If used, the function 18 selects a particular algorithm for implementing the channel equalizer receiver 16 based on the channel parameters which have been estimated. The algorithm is supplied to the channel equalizer as denoted diagrammatically by input 17. In practice of course this will be implemented by the appropriate algorithm being selected as a code sequence from the instruction memory.

The channel parameters $\gamma_n(k)$ are also supplied to a Selection of Equalizer Parameters function 14. The equalizer parameter selection function 14 is used in the event that a channel equalizer is selected (as denoted by block 16) and controls parameters used for implementing the equalizer receiver, these parameters being denoted $\theta_n(k)$, n=1, . . . , $N_E$, where $N_E$ denotes the number of relevant equalizer parameters.

The following description pertains to the identification of the current interference scenario in a wireless cellular receiver, based on information on the power transmitted from the neighboring cells.

In particular, the information collected from the neighboring cell measurements is used to determine the total number of dominant interference cells and thence to compute the total dominant inter-cell interference power (which may or may not coincide with the total detected inter-cell interference power). A different receiver signal processing algorithm is then assigned depending on the number of dominant cells and the relative measure of the serving cell compared with the total dominant interference cell power.

The assigned interference scenario, i.e., the number of dominant interfering cells, can then be used to select a specific receiver adaptation threshold design for the relevant operation conditions. In one embodiment, the threshold is then compared with a power ratio as described in more detail below to select between an LS and an MMSE equalizer. In an alternative embodiment, the selection of the equalizer depends on the power ratio and an estimated Doppler.

Figure 4:
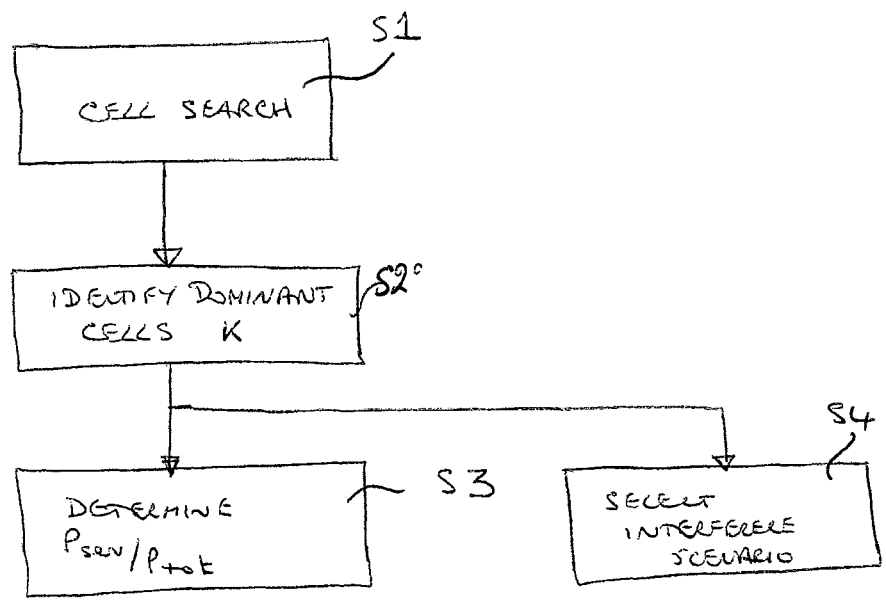
FIG. 4 is a schematic flow chart showing operation of a method of estimating an interference scenario including the derivation of the ratio of the serving cell power to the total interfering power from the dominant interfering cells.

FIG. 4 is a schematic flow diagram showing a function for estimating an interference scenario, including the derivation of the ratio of the serving cell power to the total interfering power from the dominant interfering cells.

In an embodiment of a WCDMA/HSDPA receiver described herein, the identification of the current interference scenario is based on the neighboring cells measurements carried out during a cell search, S1. In particular, the algorithm for identification of the interference scenario makes use of a cell search table containing the powers $P_k$, k=1, ..., N of all detected cells, excluding the serving cell. More specifically, the search result gives the power of the CPICH of each cell, which we assume is a constant portion of the total cell power.

A detected cell is a cell that has satisfied the detection criteria to be included in the cell database.

Denote by K the number of dominant interfering cells within a predefined time period. The number of dominant cells is identified by comparing the detected cell signals with a level. The invention applies where the dominant cells coincide with the detected cells and also in a case where the dominant cells are a subset of the detected cells.

The number of dominant interfering cells K is identified in S2.

The total inter-cell interference power is defined in S3 as $$P_{tot} = \sum_{k=1}^{K} P_k.$$

Denote the serving cell power by $P_{serv}$, and determine (S3) the ratio of the serving cell power to the total detected cell interference power $P_{serv}/P_{tot}$. The number of dominant interfering cells K is used to determine the interference scenario (S4), which as we will describe below determines the threshold design, including a threshold value for the estimated $P_{serv}/P_{tot}$.

Figure 5:
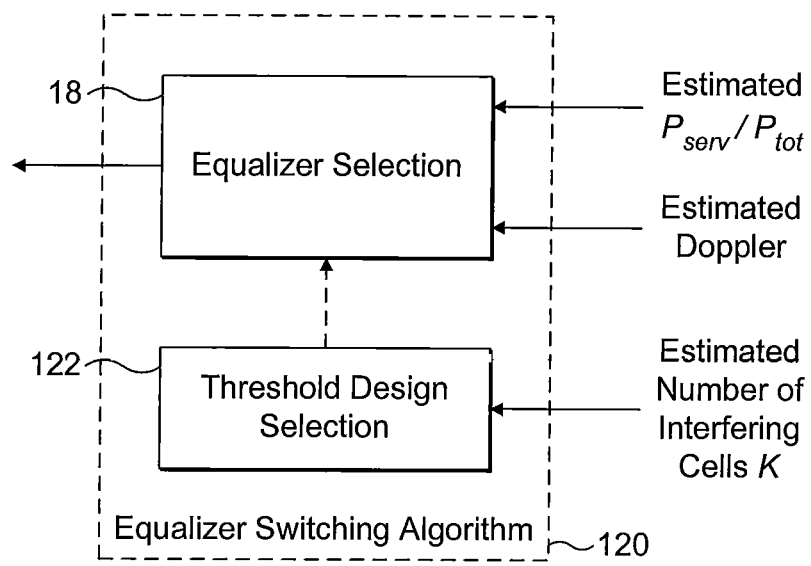
FIG. 5 is a block diagram of the procedure for the selection of the appropriate equalizer parameters and/or equalizer signal processing algorithm.

As shown in FIG. 5, the number of dominant cells K (i.e., the selected interference scenario) is supplied to an equalizer switching algorithm function 120. The function 120 can also receive other inputs from other channel parameter estimation functions of the type which can be used to select equalizer implementations. Such parameters include, for example, Doppler frequency estimates. The number K is supplied to a threshold design selection function 122 in the equalizer switching algorithm function 120. The output of the threshold design selection function 22 is supplied to the equalizer selection function 18 which also receives as inputs the ratio $$\frac{P_{serv}}{P_{tot}}$$

and the estimated Doppler function. Other possible inputs to the equalizer selection function 18 are described later. The output of the equalizer selection function 18 which represents a selected equalizer implementation which is most suited to the interference scenario which is being determined is then used in the receiver for processing received signal samples.

The equalizer implementation can be selected in hardware, but it is more likely and more advantageous that it will be selected by selecting a particular code sequence to be executed on a processor in a so-called soft modem environment.

In general terms, with a value of K equal to 1, we determine that the interference scenario is very suited to the use of a LS equalizer (or alternative interference rejection or interference cancellation algorithms), for most values of $P_{serv}/P_{tot}$. Correspondingly, the interference scenario defines a relatively high threshold θ for the value of $P_{serv}/P_{tot}$ above which the interference scenario is not suited to the use of an LS equalizer (or alternative interference rejection or interference cancellation algorithms).

Given a value of K, the ratio $P_{serv}/P_{tot}$ is compared with the threshold θ—below the threshold, an LS equalizer or equivalent would be selected, where above the threshold an MMSE equalizer would be selected. Note however that, as will be described below, depending on the particular embodiment, the equalizer selection may depend not only on the ratio $P_{serv}/P_{tot}$, but on the ratio $P_{serv}/P_{tot}$ and the estimated Doppler.

As K increases, the suitability to interference cancellation progressively decreases, and hence the defined threshold value θ for comparison with $P_{serv}/P_{tot}$ decreases.

If K equals zero, then we can determine that we have purely AWGN like interference, typical of a laboratory situation where the interference of many cells is modeled by an AWGN source. This situation is unsuited to the use of a LS equalizer (or alternative interference rejection or interference cancellation algorithms). In this case we can either use a very low threshold θ, or more simply directly select an MMSE equalizer.

In a real world situation, undetected cells are likely to comprise a proportion of the total interference power and yet be undetected because they are of low level. Nevertheless, from the study of typical interference distribution presented in the 3GPP document TR 25.963 v8.0.0, "Feasibility Study on Interference Cancellation for UTRA FDD User Equipment (UE)", December 2008, the strongest interfering cell typically accounts for about 40-50% of the total interference power, and the two strongest interfering cells for about 60-70% of the total interference power. This implies that it is rare to get many low level undetected cells and no strong interferer, which implies that the above algorithm is robust in real world situations.

Laboratory testing of the LS equalizer (or of alternative interference rejection or interference cancellation algorithms) is likely to only include a small number of interfering cells and a proportion of AWGN. However, even in this situation, the ratio $P_{serv}/P_{tot}$ will still give a clear indication of a scenario requiring the use of a LS equalizer (or alternative interference rejection or interference cancellation algorithms) using the same metric as for the real world situation.

Furthermore, applying a filter to the value K and the individual quantities $P_{serv}$ and $P_{tot}$ makes it is possible to remove any effects of false alarms from the cell detection algorithm.

There follows a more specific discussion of the use of the selected interference scenario for the selection of the appropriate receiver implementation.

Interference Scenario A—One Dominant Interfering Cell (K=1)

Figure 6:
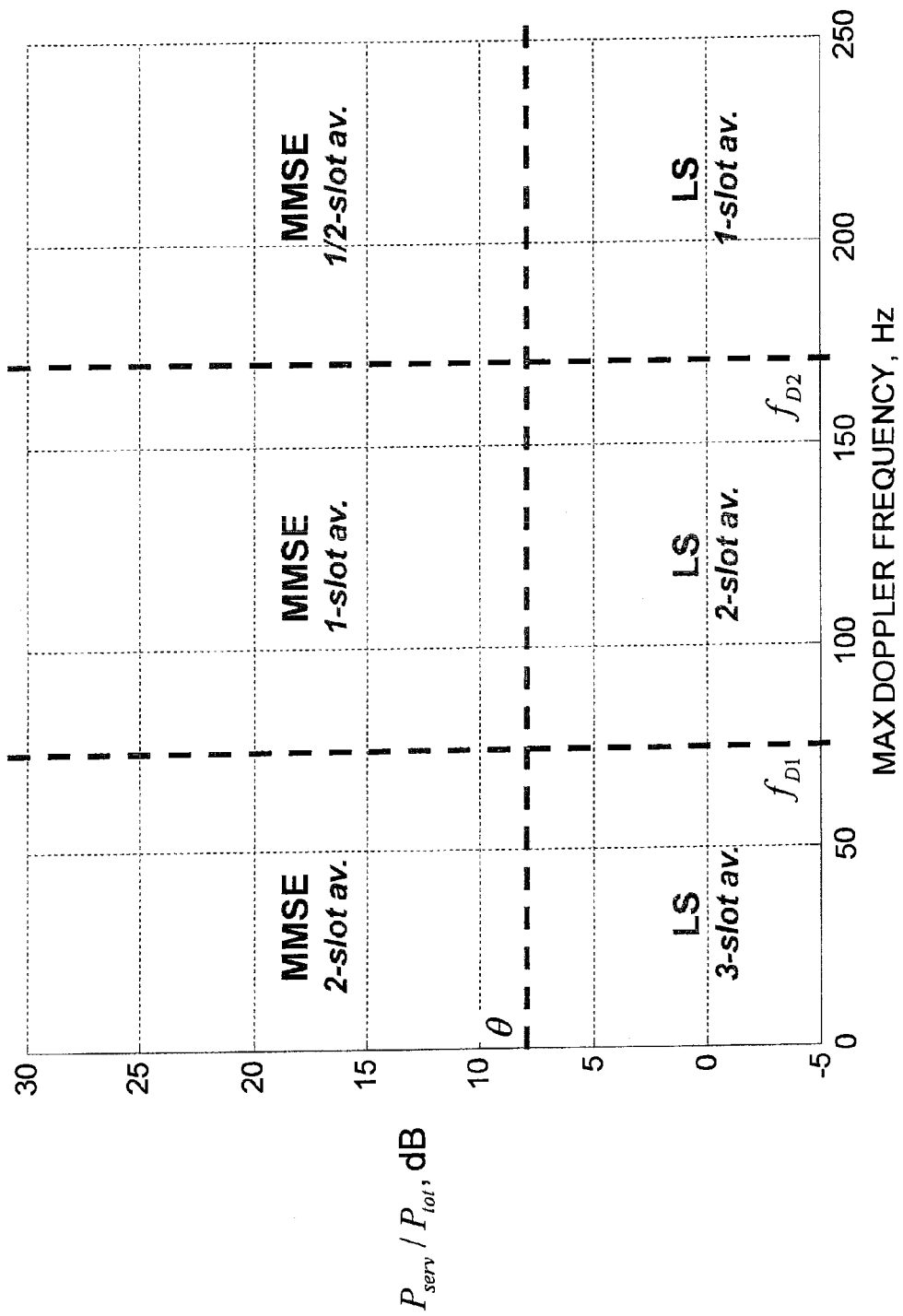
FIGS. 6 and 7 are graphical representations of a typical implementation of the selection of the appropriate equalizer parameters and/or equalizer signal processing algorithm, for two out of the number of considered interference scenarios.
Figure 8:
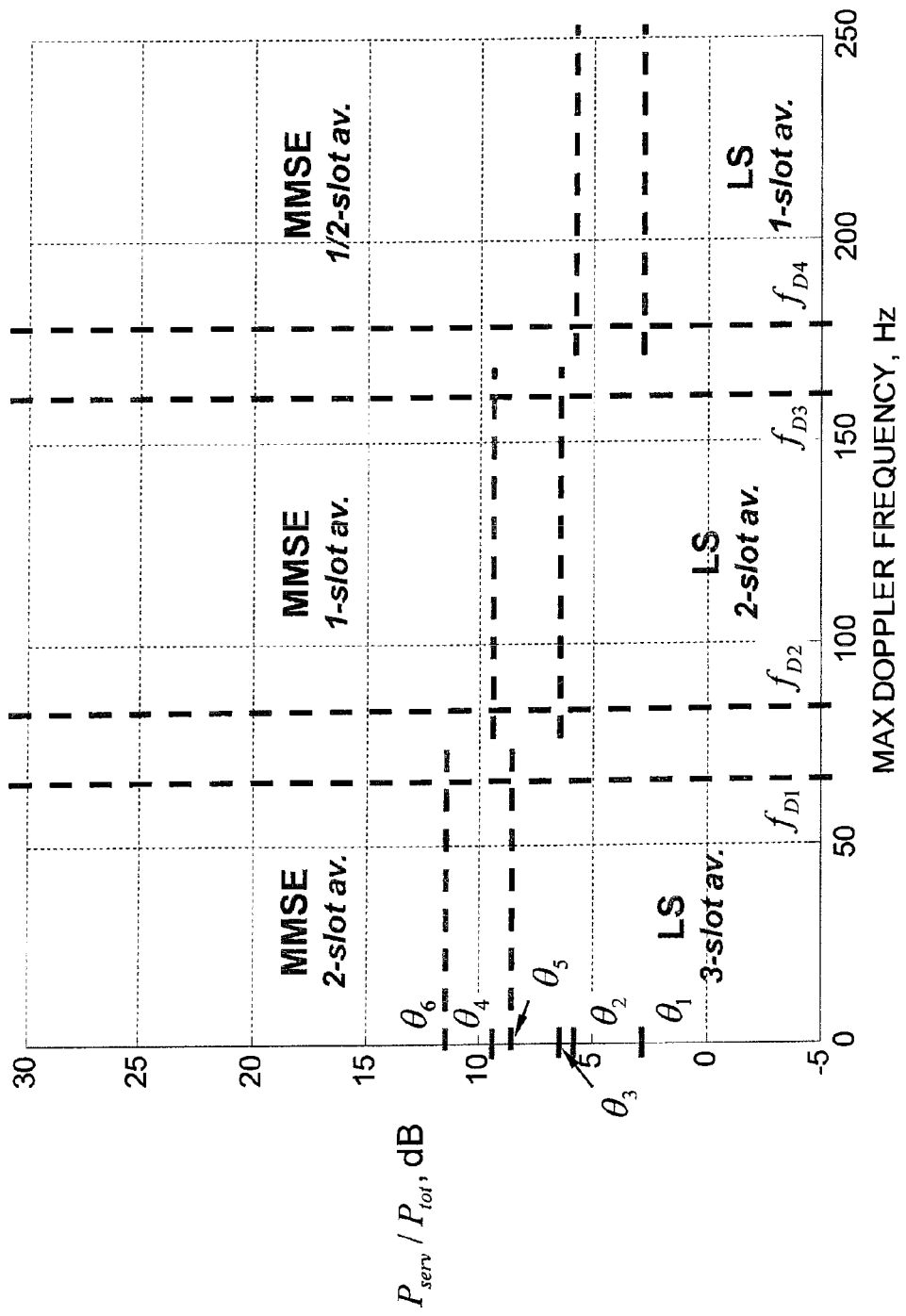
FIGS. 8 and 9 are graphical representations of an alternative implementation of the selection of the appropriate equalizer parameters and/or equalizer signal processing algorithm, for two out of the number of considered interference scenarios.

In the case where the interference scenario is identified as one dominant interfering cell (K=1), the equalizer switching algorithms selects the appropriate equalizer implementation based on both the estimated ratio $P_{serv}/P_{tot}$ and the estimated Doppler. The equalizer selection is initialized to the 1-slot average MMSE equalizer. As shown in FIG. 6, in each of the three regions of low Doppler, medium-high Doppler and very high Doppler, the algorithm will select between one MMSE equalizer and one LS equalizer implementation depending on the estimated ratio $P_{serv}/P_{tot}$, based on comparison with the threshold value θ. In the alternative implementation of FIG. 8, in each of the three regions of low Doppler, medium-high Doppler and very high Doppler, the algorithm will select between one MMSE equalizer and one LS equalizer implementation depending on the estimated ratio $P_{serv}/P_{tot}$, based on comparison with threshold values $θ_1$-$θ_6$ which vary depending on the Doppler estimate. In FIG. 8 the different thresholds are implemented with hysteresis, i.e., with different thresholds values when changing state in opposite directions.

Interference Scenario B—Two Dominant Interfering Cells (K=2)

Figure 7:
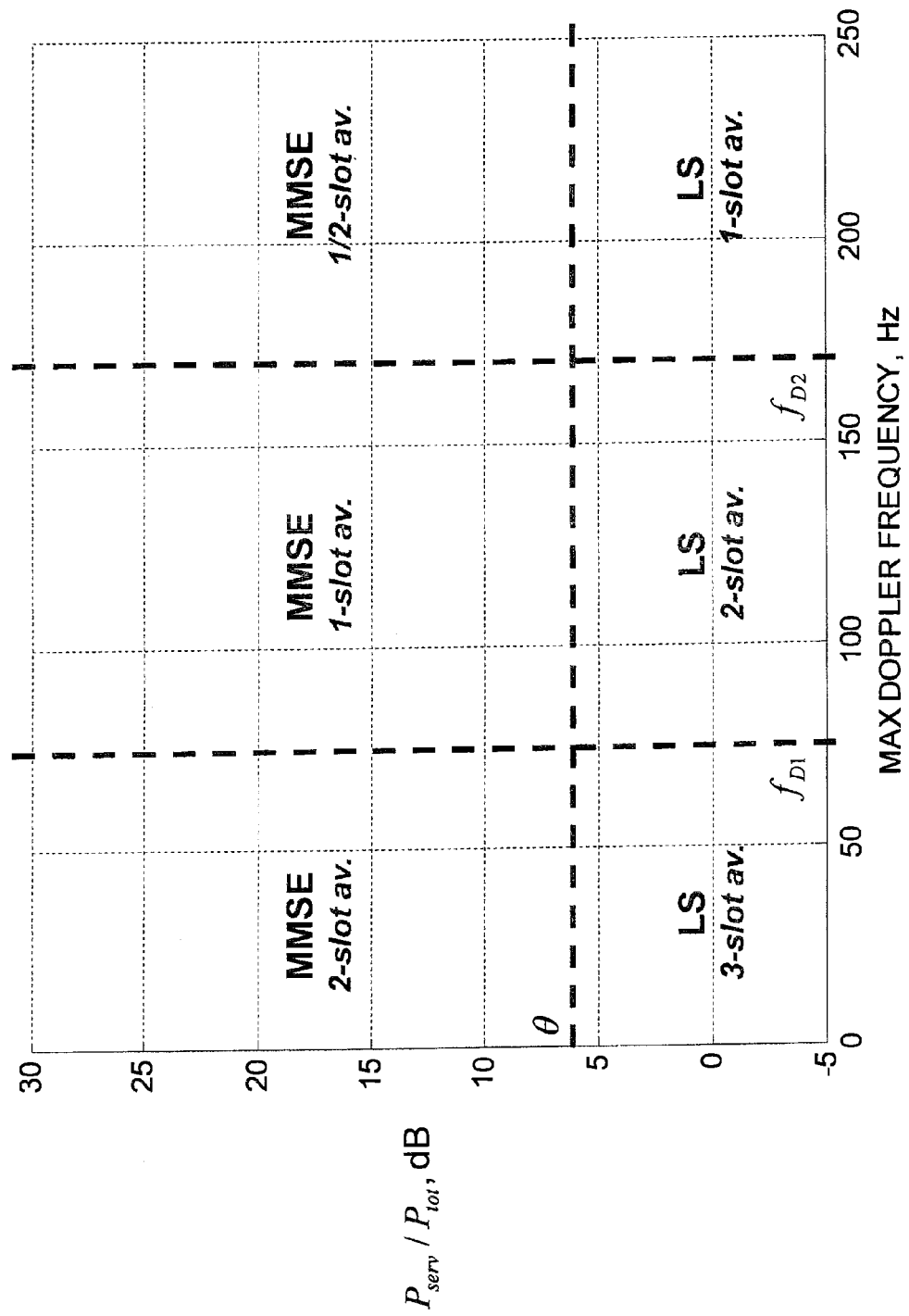
Figure 9:
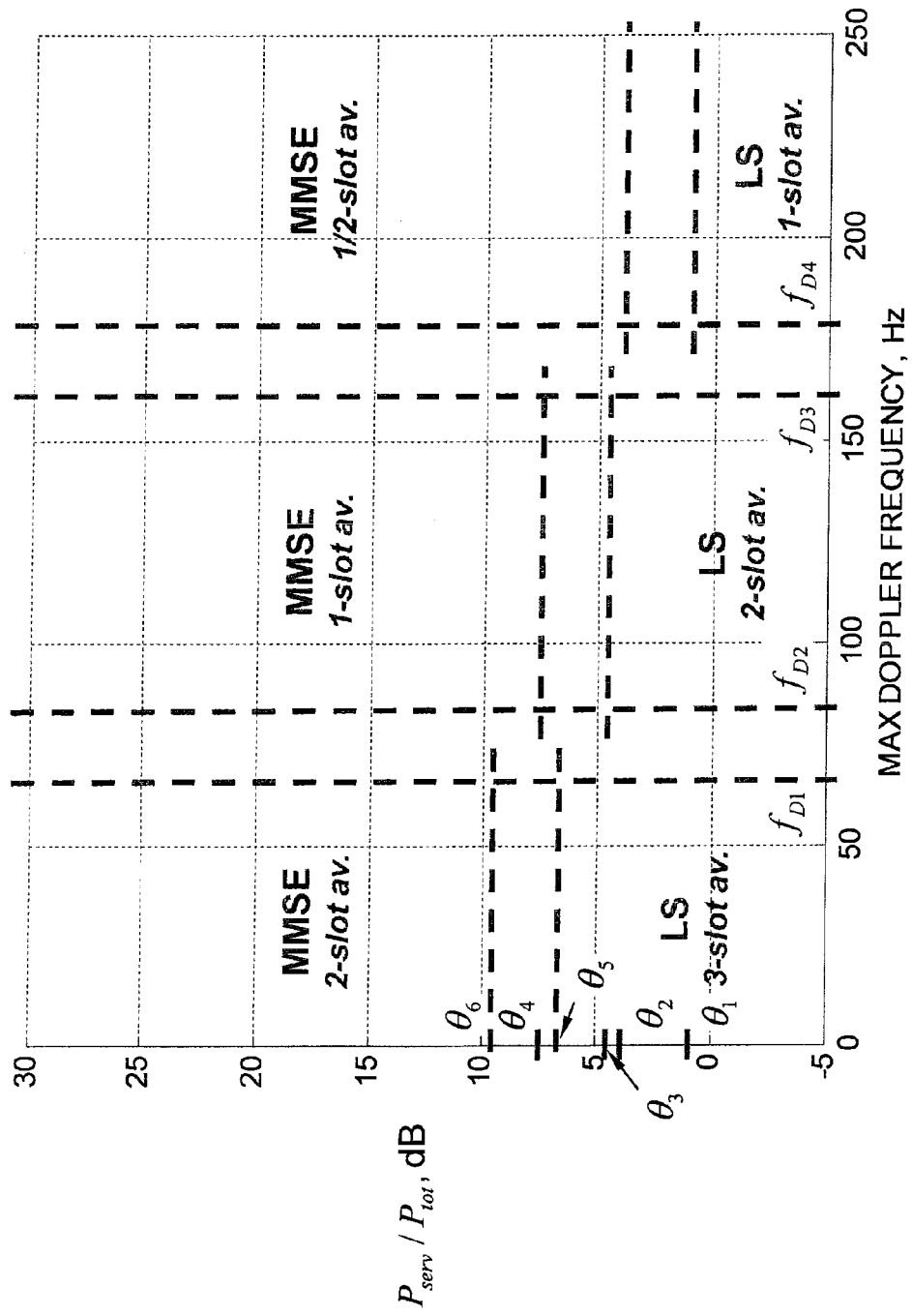

In the case where the interference scenario is identified as two dominant interfering cells (K=2), the equalizer switching algorithms selects the appropriate equalizer implementation based on both the estimated ratio $P_{serv}/P_{tot}$ and the estimated Doppler. The equalizer selection is initialized to the 1-slot average MMSE equalizer. As shown in FIG. 7, in each of the three regions of low Doppler, medium-high Doppler and very high Doppler, the algorithm will select between one MMSE equalizer and one LS equalizer implementation depending on the estimated ratio $P_{serv}/P_{tot}$, based on comparison with the threshold value θ. In the alternative implementation of FIG. 9, in each of the three regions of low Doppler, medium-high Doppler and very high Doppler, the algorithm will select between one MMSE equalizer and one LS equalizer implementation depending on the estimated ratio $P_{serv}/P_{tot}$, based on comparison with threshold values $θ_1$-$θ_6$ which vary depending on the Doppler estimate. In FIG. 9 the different thresholds are implemented with hysteresis, i.e., with different thresholds values when changing state in opposite directions.

Interference Scenario C—Three Dominant Interfering Cells (K=3)

In the case where the interference scenario is identified as three dominant interfering cells (K=3), the equalizer switching algorithms selects the appropriate equalizer implementation based on both the estimated ratio $P_{serv}/P_{tot}$ and the estimated Doppler. The equalizer selection is initialized to the 1-slot average MMSE equalizer. The operation differs from the case of interference scenarios A and B in the values of the different thresholds employed for the selection of the appropriate receiver implementation.

The above example is limited to two or three dominant interfering cells only to simplify the description of the algorithm, while a typical practical implementation may advantageously consider interference scenarios with more than three dominant interfering cells.

Note that in FIG. 7 (FIG. 9) the $P_{serv}/P_{tot}$ thresholds are lower than the equivalent thresholds in FIG. 6 (FIG. 8). More specifically, the threshold value θ in FIG. 7 ($θ_1$-$θ_6$ in FIG. 9) is lower than the threshold value θ in FIG. 6 ($θ_1$-$θ_6$ in FIG. 8), reflecting the fact that the use of the LS equalizer (or of alternative interference rejection or interference cancellation algorithm) is more important even at lower levels of total interference $P_{tot}$ in an interference scenario with a lower number of dominant interfering cells.

Figure 10:
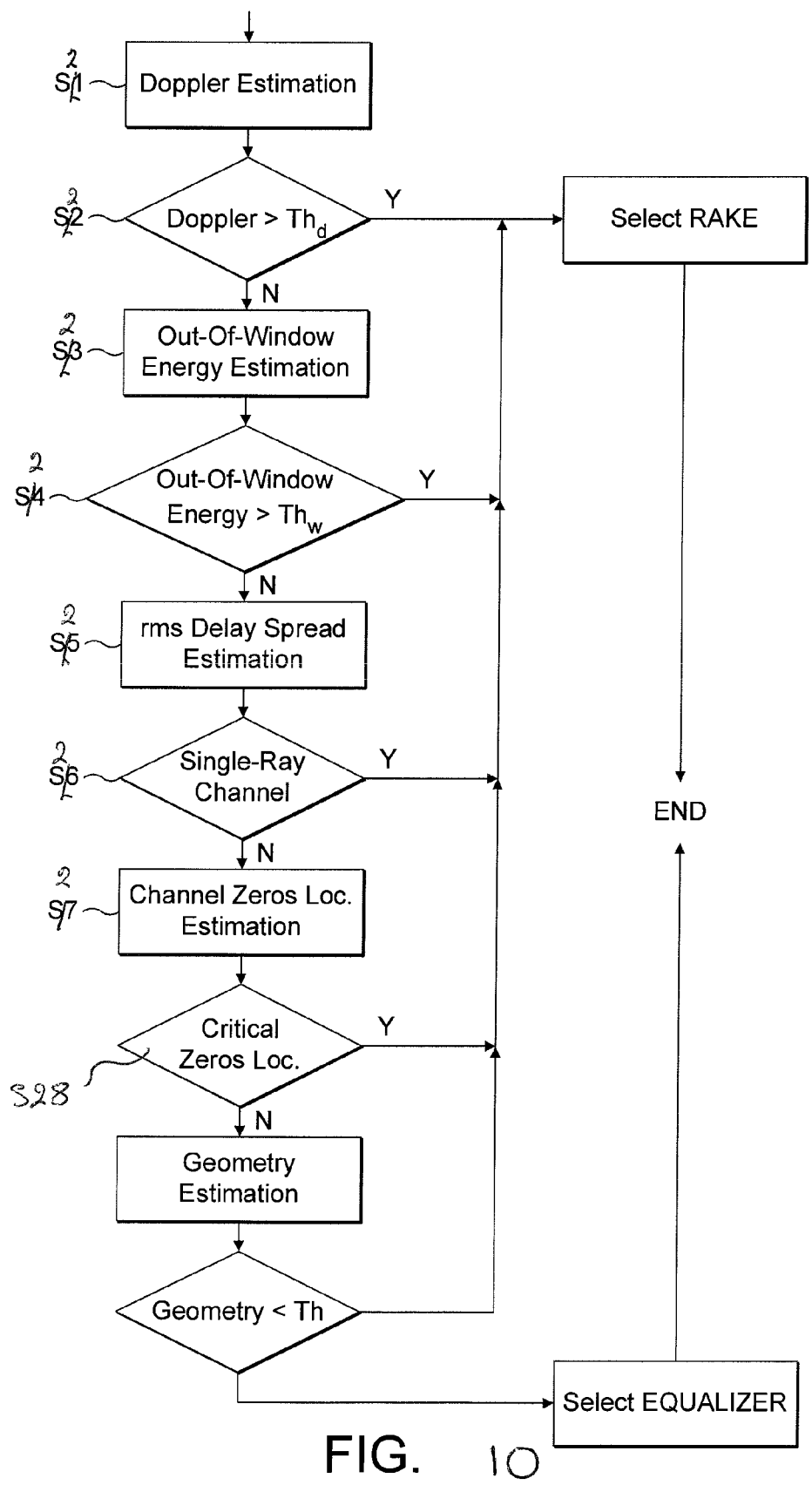
FIG. 10 is a schematic diagram of a sequence of steps for selecting a processing function.

Reference will now be made to FIG. 10 to describe a method of selecting a processing function based on the estimation of particular channel parameters. The inventors have found that it is advantageous to apply the selection criteria by examining different channel parameters in a certain sequence (as illustrated in FIG. 10 and described below). It will readily be appreciated however that other appropriate sequences may also be utilized. In particular, the Doppler effect can be used as discussed above with a selected interference scenario.

Step S21 produces an estimate of the degree of non-stationarity of the channel, related to mobility of the user of the transmission channel, given for example by an estimate of the Doppler spread or the maximum Doppler frequency or by an estimate of the relative speed of the mobile terminal. These estimators are known in the art and so the manner in which it is estimated is not discussed further herein. Examples are described in G. L. Stuber, "Principles of Mobile Communications", Norwell, Mass., Kluwer, 1996, A. Sampath and J. M. Holtzman, "Estimation of Maximum Doppler Frequency for Handoff Decisions", in Proceedings of IEEE Vehicular Technology Conference, Secaucus, N.J., May 1993, pp. 859-862, C. Tepedelenlioglu, A. Abdi, G. B. Giannakis, and M. Kaveh, "Estimation of Doppler spread and Signal Strength in Mobile Communications with Applications to Handoff and Adaptive Transmission", Wireless Communications and Mobile Computing, vol. 1, no. 2, pp. 221-242, March 2001, and references therein. The receiver can be designed to use equalizer processing for relatively low time-varying channels, and to switch to rake processing for fast time-varying channels, where the switching threshold should depend on the desired trade-off between equalizer complexity and receiver performance. A Doppler comparison step S22 compares a Doppler estimation signal $γ_1$ with a suitable threshold $Th_d$. If $γ_1$ exceeds the threshold $Th_d$, the step selects rake receiver processing. If the Doppler estimation signal $γ_1$ does not exceed the threshold $Th_d$, the comparison produces a negative answer, and the selection process continues with an out-of-window energy comparison step.

The out-of-window energy estimation S23 provides an estimate of the channel energy outside the time window used for equalizer channel estimation. An example is described in C. Luschi, M. Sandell. P. Strauch, and R.-H. Yan, "Adaptive Channel Memory Truncation for Digital Mobile Communications", in Proceedings of IEEE International Workshop on Intelligent Signal Processing and Communication Systems, Melbourne, Australia, November 1998, pp. 665-669. Equalizer processing is selected only when a significant percentage of the channel energy is captured by the channel estimation window—which will not happen in the case of very high delay spread). To this end, the out-of-window energy $γ_2$ is compared with a threshold $Th_w$ S24. If $γ_2$ is greater than the threshold $Th_w$, the step selects rake receiver processing. If the out-of-window energy $γ_2$ is not greater than $Th_w$, to the selection process continues with a single-ray channel detection step S26.

A delay spread estimation S25 generates an output $γ_3$, given for example by an estimate of the root mean square (rms) delay spread. An example of delay spread estimation is given in H. Arslan and T. Yucek, "Delay Spread Estimation for Wireless Communication System", in Proceedings of IEEE International Symposium on Computers and Communication, Kemer-Antalya, Turkey, June-July 2003, pp. 282-287. The parameter $γ_3$ is supplied to the single-ray channel detection step S26 to determine if the transmission channel can be considered to result from a single propagation path (multipath absent). In case of single-path propagation, the step selects rake receiver processing.

More generally identification of the conditions of very high delay spread (long channel impulse response) and zero delay spread (single ray channel impulse response) can be used to switch the receiver to rake receiver processing. The term "channel length" is often used in the art to denote the temporal duration of the channel impulse response, which is related to the channel delay spread.

In the event of non single-ray channel, the process passes to an estimate of channel characteristics from the location of the channel zeros in the z-plane (S27). Examples of how this is done are given in Y. Bistritz, "Zero Location with Respect to the Unit Circle of Discrete-Time Linear System Polynomials", Proceedings of the IEEE, vol. 72, no. 9, pp. 1131-1142, September 1984, and references therein. The receiver may be designed to switch to rake processing in the presence of locations of the zeros that identify channel characteristics that are critical for the operation of the equalizer—as in the case of linear equalization with channel zeros close to the unit circle of the z-plane, or for fractionally-spaced equalization or, more generally receive diversity equalization (multiple receive antennas or multiple subchannels obtained by oversampling) with common zeros among the equalizer subchannels. The estimate of the channel zeros location $\gamma_4$ is supplied to a critical zeros location detector step S28, which selects rake receiver processing in the presence of the locations of zeros which would be critical for operation of an equalizer. In case of non-critical channel characteristics, the selection process continues with a cell geometry comparison step.

A cell geometry estimation block provides an estimate $\gamma_5$ of the ratio between received intracell power and noise-plus-intercell interference power (or its inverse), or an estimate of the ratio between total received power and noise-plus-intercell interference power (or its inverse). An example of a cell geometry estimation technique that can be used is given in the following. Alternatively, any known technique for estimating signal to disturbance ratios on an incoming radio signal can be used, where disturbance is interference or noise or both. An example of signal to disturbance ratio estimation for a wireless cellular system is given in M. Turkboylari and G. L. Stuber, "An Efficient Algorithm for Estimating the Signal-to-Interference Ratio in TDMA Cellular Systems", IEEE Transactions on Communications, vol. 46, no. 6, pp. 728-731, June 1998. As a further alternative, an estimate of the signal to disturbance ratio $\gamma_6$ of the estimated channel response can be used, or any other indication of the quality of the available channel estimate. In particular, the above technique for selecting an interference ratio using the number of dominant cells can be used.

In addition to switching between the rake and equalizer, in the case that the equalizer 16 has been selected the channel parameters estimated by the channel parameter estimation function 10 can be used to select the type of equalizer and/or parameters $\theta_n$, n=1, ..., $N_E$ for the implementation of the equalizer 16.

Figure 11:
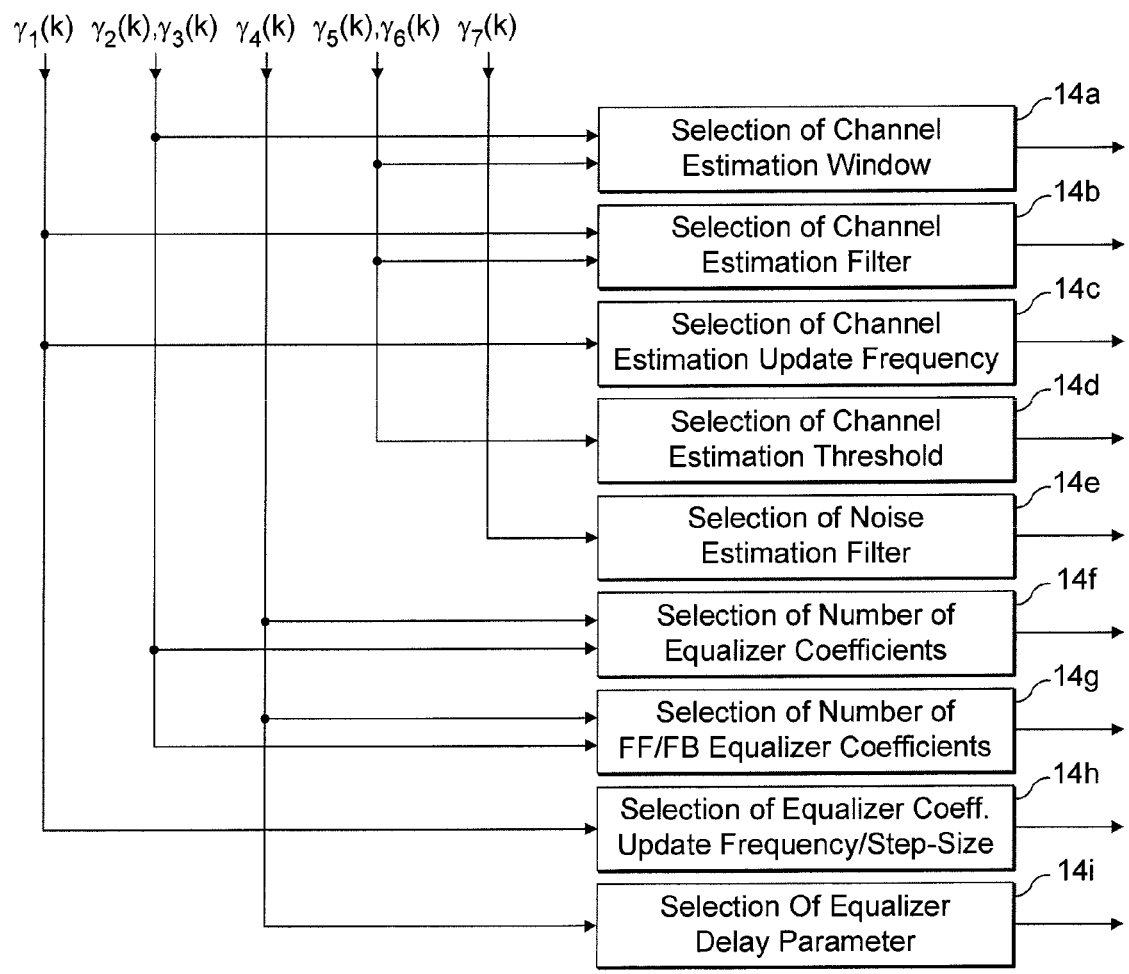
FIG. 11 is a schematic block diagram for the selection of a set of equalizer parameters.

FIG. 11 depicts a schematic block diagram for the selection of a set of equalizer parameters within the equalizer parameter selection function 14.

The time window W for estimation of the channel impulse response in the equalizer can be selected on the basis of an estimate of the channel delay spread $\gamma_3$ (block 14a of FIG. 11).

The memory of an appropriate filter for estimation of the channel impulse response (block 14b of FIG. 11) and the frequency of update of the estimated channel impulse response (block 14c of FIG. 11) can be selected on the basis of an estimate of the degree of channel non-stationarity or temporal selectivity, for example through an estimate of the channel Doppler spread $\gamma_1$. The selection of the channel estimation filter could also be based on an estimate $\gamma_5$ of the input signal-to-disturbance ratio or the cell geometry, and/or on an estimate $\gamma_6$ of the signal-to-disturbance ratio of the estimated channel response.

At intermediate to low signal to noise-plus-interference ratios, the total channel estimation error can be reduced by setting to zero the estimated channel coefficients with amplitude lower than a suitable threshold. The value of this threshold can be selected based on an estimate $\gamma_5$ of the input signal-to-disturbance ratio or the cell geometry, and/or on an estimate $\gamma_6$ of the signal-to-disturbance ratio for the estimated channel coefficients (block 14d of FIG. 11).

The memory of appropriate filters for estimation of the input noise variance $\sigma^2$, for example in the case of MMSE equalization, can be made adaptive in the presence on non-stationary input noise by measuring the degree of non-stationarity of the input disturbance $\gamma_7$ (for instance, the time interval over which the noise is approximately constant) (block 14e of FIG. 11). On a completely different basis, the filtering may depend on the periodicity with which it is convenient to collect observations on the input noise—this in turn may be motivated simply by the need to reduce the implementation complexity in specific operating conditions or under critical processing requirements.

The number of equalizer coefficients (i.e., the equalizer time span) can be selected for example on the basis of an estimate of the channel length or the channel delay spread $\gamma_3$ and the position of the channel zeros in the z-plane $\gamma_4$ (block 14f of FIG. 11).

The number of feedforward and feedback equalizer coefficients in the case of decision feedback equalization can similarly be based on estimates of the channel out-of-window energy $\gamma_2$ and/or of the channel length (or the channel delay spread) $\gamma_3$ and the position of the channel zeros in the z-plane $\gamma_4$ (block 14g of FIG. 11).

The frequency of update of the equalizer coefficients in the case of block equalization, or the coefficient step size in the case of adaptive equalization, can be selected on the basis of an estimate of the degree of channel non-stationarity or temporal selectivity, e.g., through an estimate of a channel Doppler spread $\gamma_1$ (block 14h of FIG. 11).

The equalizer delay can be selected on the basis of an estimate of the channel phase characteristics derived from location of the channel zeros in the z-plane $\gamma_4$ (block 14i of FIG. 11).

Figure 12:
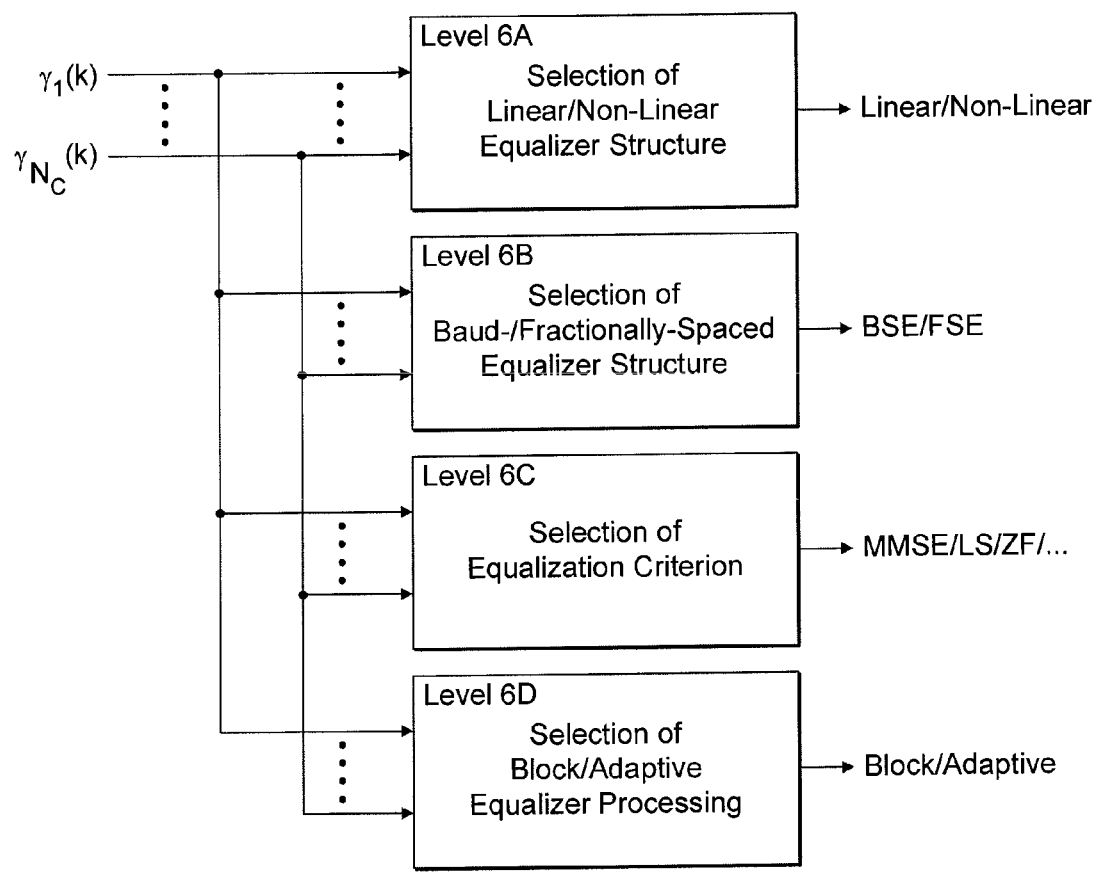
FIG. 12 is a schematic block diagram for the selection of the equalizer algorithm.

Reference will now be made to FIG. 12 which is a schematic block diagram illustrating the selection of a particular equalization algorithm based on the estimated channel conditions. While the sequence described below represents one useful embodiment of the invention, it will be appreciated that any other sequence can be utilized to implement selection of the appropriate equalizer algorithm.

Level 6A in FIG. 12 denotes the selection of a linear or non-linear equalizer structure. Linear equalization based on a transversal filter structure has been employed since the early work of Lucky (R. W. Lucky, "Automatic Equalization for Digital Communication", Bell System Technical Journal, vol. 44, pp. 547-588, April 1965), Proakis and Miller (J. G. Proakis and J. H. Miller, "An Adaptive receiver for Digital Signaling Through Channels with Intersymbol Interference", IEEE Transactions on Information Theory, vol. 15, no. 4, pp. 484-497, July 1969) and others (see S. U. H. Qureshi "Adaptive Equalization", Proceedings of the IEEE, vol. 73, no. 9, pp. 1349-1387, September 1985 and references therein). Non-linear equalizers include decision-feedback equalizers (described for example in J. Salz, "Optimum Mean Square Decision Feedback Equalization", Bell System Technical Journal, vol. 52, pp. 1341-1373, October 1073, and C. A.

Belfiore and J. H. Park, Jr., "Decision Feedback Equalization", Proceedings of the IEEE, vol. 67, no. 8, pp. 1143-1156, August 1979) and maximum-likelihood (ML) or maximum a posteriori probability (MAP) trellis equalizers (described for example in G. D. Forney, Jr., "Maximum Likelihood Sequence Estimation of Digital Sequences in the Presence of Intersymbol Interference", IEEE Transactions on Information Theory, vol. 18, no. 3, pp. 363-378, May 1972, and L. R. Bahl, J. Cocke, F. Jelinek, and Raviv, "Optimal Decoding of Linear Codes for Minimizing Symbol Error Rate", IEEE Transactions on Information Theory, vol. 20, pp. 284-287, March 1974). Linear and non-linear equalizers are also discussed in S. Benedetto, E. Biglieri, and V. Castellani, "Digital Transmission Theory", Englewood Cliffs, N.J., Prentice-Hall, 1987 and D. P. Taylor, G. M. Vitetta, B. D. Hart, and A. Mämmelä, "Wireless Channel Equalization", European Transactions on Telecommunications, vol. 9, no. 2, pp. 117-143, March 1998. A criterion for making the choice between a linear or non-linear equalizer can be based for example on the location of channel zeros in the z-plane $\gamma_4$. In addition, this selection could depend on specific transmission conditions. For instance, in an HSDPA system, the use of a decision feedback equalizer (that is, having a non-linear structure) may be limited to a condition where the user is allocated a significant percentage of the downlink power—which determines the portion of the downlink signal that can be used for decision feedback without requiring to make decisions on other user's data.

Level 6B in FIG. 12 denotes the selection of Baud-spaced or fractionally-spaced equalizer structure. Baud-spaced (symbol- or chip-spaced) and fractionally spaced equalizers are described for example in S. U. H. Qureshi "Adaptive Equalization", Proceedings of the IEEE, vol. 73, no. 9, pp. 1349-1387, September 1985 and J. R. Treichler, I. Fijalkow, and C. R. Johnson, Jr., "Fractionally Spaced Equalizers", IEEE Signal Processing Magazine, vol. 13, no. 3, pp. 65-81, May 1996. This selection is made based for instance on the location of the channel zeros in the z-plane $\gamma_4$, and could optionally take into account the amount of excess transmission bandwidth (roll-off factor of transmit and receive filters).

It will be clear that either baud-spaced or fractionally spaced design can be used with either of the linear or non-linear selections.

Level 6C in FIG. 12 denotes the selection of the equalizer cost function, specifically between the options of Minimum Mean-Square Error (MMSE) criterion, Least-Squares (LS) criterion, Zero-Forcing (ZF) criterion, or a criterion based on a different cost, including the maximum-likelihood (ML) criterion and the maximum a posteriori probability (MAP) criterion. MMSE, LS, ZF and ML equalizers are described in S. U. H. Qureshi "Adaptive Equalization", Proceedings of the IEEE, vol. 73, no. 9, pp. 1349-1387, September 1985 and S. Benedetto, E. Biglieri, and V. Castellani, "Digital Transmission Theory", Englewood Cliffs, N.J., Prentice-Hall, 1987, while MAP equalizers are discussed in D. P. Taylor, G. M. Vitetta, B. D. Hart, and A. Mämmelä, "Wireless Channel Equalization", European Transactions on Telecommunications, vol. 9, no. 2, pp. 117-143, March 1998 and C. Luschi, et al., "Advanced Signal Processing Algorithms for Energy-Efficient Wireless Communications", Proceedings of the IEEE vol. 88, no. 10, pp. 1633-1650, October 2000. Parameters that can be used to select between these criteria include an estimate of the signal-to-disturbance ratio or other parameters indicative of the statistical distribution of the disturbance. For instance, acceptable performance can be obtained for high signal-to-disturbance ratios using the ZF criterion. On the other hand, the use of a LS equalizer is preferable with respect to a MMSE equalizer in the presence of non-Gaussian disturbance.

Level 6D in FIG. 12 denotes the choice between equalizer block processing or the implementation of a tap adaptation rule. The selection between these two strategies may be made dependent on the degree of channel non-stationarity or temporal selectivity, e.g., through an estimate of a channel Doppler spread $\gamma_1$.

Block processing is mentioned for example in A. Klein, "Data Detection Algorithms Specially Designed for the Downlink of CDMA Mobile Radio Systems", in Proceedings of IEEE Vehicular Technology Conference, vol. 1, Phoenix, Ariz., May 1997, pp. 203-207. An adaptive algorithm is mentioned in K. Hooli, M. Latva-aho and M. Juntti, "Performance Evaluation of Adaptive Chip-Level Channel Equalizers in WCDMA Downlink", in Proceedings of IEEE International Conference on Communications, vol. 6, Helsinki, Finland, June 2001, pp. 1974-1979.

Figure 13:
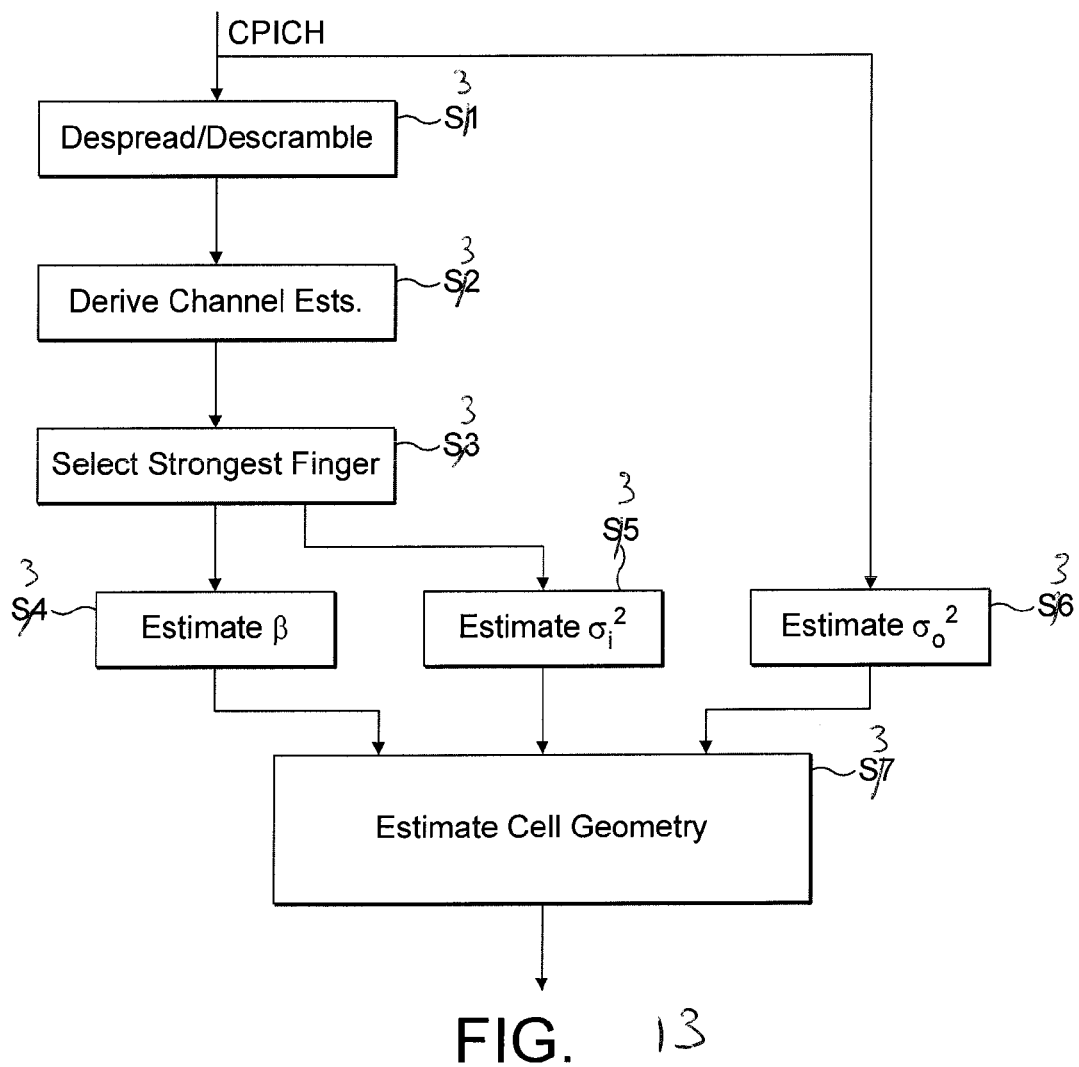
FIG. 13 is a schematic flow diagram showing the steps in a proposed geometry estimation algorithm.

FIG. 13 is a schematic flow diagram showing the steps in a proposed geometry estimation algorithm.

At step S31, the received CPICH symbols are subject to despreading/descrambling. In a WCDMA receiver, there is a mechanism for rake finger tracking/management, whereby fingers are assigned to significant multipath components. For each multipath component or finger, since the CPICH data is known, a channel estimate $h_l$, $l=0, \ldots, L_0-1$, where $L_o$ is the total number of multipath channel coefficients, can be derived from the despread CPICH symbols as denoted in step S32.

In the following discussion, extensive use is made of the strongest of the rake fingers, that is the one corresponding to the channel delay of the estimated channel tap with the highest power, and this finger is selected at step S33. Nevertheless it will be appreciated that there are other possible implementations which can include the use of more or all the relevant channel delays or fingers, and even implementations that are based on the estimation of the channel coefficients without any connection with a rake receiver.

At step S34, the orthogonality factor $\beta$ is estimated. The orthogonality factor $\beta$ gives the relation between $\hat{I}_{or}$ and MAI. It is established in the following way: Given a channel estimate $h_l$, $l=0, \ldots, L_0-1$, where $L_o$ is the total number of fingers, denoting by i the index of the strongest rake finger, we define the orthogonality factor $\beta$, as $$\beta_i = \frac{\sum_{l=0}^{L_0-1} |h_l|^2 - |h_i|^2}{\sum_{l=0}^{L_0-1} |h_l|^2}$$

i.e., as the ratio of the channel power that is perceived as interference by the strongest finger to the total channel power.

At step S35, an estimation of the noise-plus-interference after descrambling/despreading is made. Although denoted step S35, this could be done in parallel with or prior to step S34 and again is based on the selected finger or fingers in step S33. This is done in the following way.

The received symbols are corrupted by interference due to the non-orthogonal components of the received signal from the wanted cell after passing through the multipath channel, plus the received signals from the other cells together with thermal noise. If we restrict our attention to the interference received on the CPICH symbols despread on the strongest finger, this quantity is given by $\sigma_i^2 = I_{oc} + \beta_i \hat{I}_{or}$.

In order to estimate the level of this interference, we compute the variance of the noise power on the CPICH symbols of the strongest finger $$\sigma_i^2 = I_{oc} + \beta_i \hat{I}_{or}$$
$$= Var\{s_{i,k}\}$$
$$= E\{|s_{i,k} - E\{s_{i,k}\}|^2\}$$
$$\approx \frac{1}{N_s - 1} \sum_{k=0}^{N_s-1} \left| s_{i,k} - \frac{1}{N_s} \sum_{k=0}^{N_s-1} s_{i,k} \right|^2,$$

where $s_{i,k}$ denotes the k-th despread CPICH symbol on the strongest finger.

According to the above equation, in step S5 the statistical mean and variance of the despread CPICH symbols are estimated by computing the sample mean and sample variance of the sequence $s_{i,k}$. However, the approach can be extended to the use of different mean and variance estimators.

Step S36 performs an estimation of the total input power. This is a straightforward estimation of the quantity $\sigma_o^2 = \hat{I}_{or} + I_{oc}$, on the basis of the composite received chip sequence before despreading. This step can use the received signal samples that are employed for automatic gain control (AGC) computation.

Step S37 denotes the combination of the above parameters to estimate the quantities $I_{oc}$ and/or $\hat{I}_{or}/I_{oc}$ (or its inverse). This is an estimate of the cell geometry as required. The estimation of the intercell interference $I_{oc}$ is implemented as follows:

$$I_{oc} = \frac{\sigma_i^2 - \beta_i \cdot \sigma_o^2}{1 - \beta_i}.$$

From $I_{oc}$ and $\sigma_o^2 = \hat{I}_{or} + I_{oc}$ derived in step S36 we can also compute an estimate of $\hat{I}_{or}/I_{oc}$, for instance as $$\hat{I}_{or}/I_{oc} = \frac{\sigma_o^2 - \sigma_i^2}{\sigma_i^2 - \beta_i \sigma_o^2},$$

or, alternatively, an estimate of $I_{oc}/\hat{I}_{or}$ as $$I_{oc}/\hat{I}_{or} = \frac{\sigma_i^2 - \beta_i \sigma_o^2}{\sigma_o^2 - \sigma_i^2}.$$

Note that it may be desirable to filter the above quantities to obtain reliable estimates.

With regard to step S35, the choice of the averaging period for the computation of $E\{S_{i,k}\}$ can be made dependent on the speed with which the user equipment (mobile terminal) is moving. For low mobile speeds, that is for slowly time varying channels, the CPICH symbol estimate can be improved by using longer averaging periods. However, for high mobile speeds, corresponding to fast time varying propagation channels, if the averaging period is too long the CPICH symbol estimate will lag behind its actual value, thus degrading the geometry estimate.

It may not be desirable to perform the geometry estimation computations continuously, but instead to select intervals over which the computation should be performed. Preferably these intervals should be chosen to avoid times at which automatic gain control values are adjusted, and to avoid any bias in the geometry estimation caused by interference from any non-orthogonal intracell transmissions (such as synchronization channels in the WCDMA network).

Figure 14:
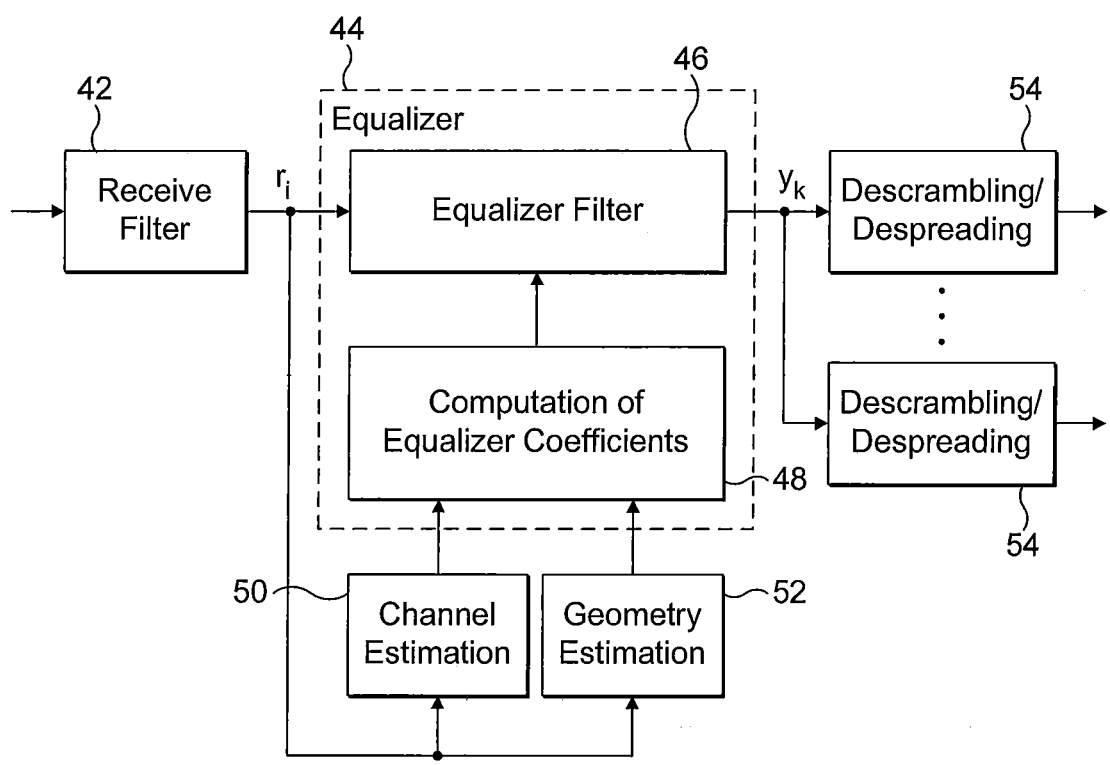
FIG. 14 is a schematic block diagram illustrating how an estimate of cell geometry can be used to compute the equalizer coefficients for use in equalizer processing.

FIG. 14 is a schematic block diagram illustrating how an estimate of cell geometry can be used to compute the equalizer coefficients for use in equalizer processing. Received signal samples are supplied to a receive filter 42 which generates a (possibly oversampled) received sequence $r_i$. This sequence is supplied to an equalizer 44 which comprises an equalizer filter 46 and a computation block 48 for the computation of the equalizer coefficients. The sequence $r_i$ is also used to provide a channel estimation at block 50 and an estimation of cell geometry at block 52. Channel estimation is known per se and is not discussed further herein. Geometry estimation is carried out in a manner described hereinabove. As described more completely in the following, the geometry estimation allows the calculation of optimum MMSE equalizer coefficients to be carried out by the computation block 48. In the case of a WCDMA downlink receiver, the output of the chip level channel equalizer 44, denoted by $y_k$, is supplied to a descrambling/dispreading function 54 for each downlink code. A detailed description of the equalizer processing applicable to a synchronous CDMA system is given below.

Consider the discrete-time signal model $$r_i = \sum_n d_n h_{i-nM} + n_i \quad (1)$$

where $r_i = r(iT_c/M)$ are the received signal samples taken at rate $T_c/M$, with $T_c$ denoting the chip interval and M the oversampling ratio, $h_l = h(lT_c/M)$ are the rate $T_c/M$ samples of the complex equivalent channel impulse response, which is assumed stationary for the time interval of interest, $d_n$ represents the complex multiuser transmitted chip sequence, and $n_i = n(iT_c/M)$ is a complex additive Gaussian process, which models thermal noise and intercell interference.

In the model (1) the channel impulse response includes the effect of the transmit and receive equivalent filters, which in the case of a WCDMA receiver are assumed root raised cosine filters with roll-off 0.22. We also assume that the channel impulse response samples $h_l$ are appreciably different from zero only for $l=0, \ldots, LM-1$, and that the channel is normalized so that its average energy is equal to 1. The noise samples $n_i$ are assumed to derive from an additive white Gaussian intercell interference-plus-noise process $v_i = v(iT_c/M)$ with zero mean and variance $\sigma_n^2$, filtered by a low-pass filter with impulse response $g_l = g(lT_c/M)$ representing the equivalent receive filter, which in the case of a WCDMA receiver is a root raised cosine filter with roll-off 0.22.

The oversampled sequence can be decomposed into M chip rate subsequences relative to M distinct subchannels. In vector notation, we d define for the k-th chip interval $$r_k^{(m)} = [r_{kM+m} r_{(k+1)M+m} \cdots r_{(k+N-1)M+m}]^T, m = 0, \ldots, M-1 \quad (2)$$

where $(\bullet)^T$ indicates vector transpose. From equations (1) and (2), we also write $$r_k^{(m)} = H^{(m)} d_k + n_k^{(m)}, m = 0, \ldots, M-1 \quad (3)$$

with $d_k = [d_{k-L+1} \ldots d_k \ldots d_{k+N-1}]^T,$

-continued $$H^{(m)} = \begin{bmatrix} h_{L-1}^{(m)} & h_{L-2}^{(m)} & \cdots & h_0^{(m)} & 0 & \cdots & 0 \\ 0 & h_{L-1}^{(m)} & \cdots & h_1^{(m)} & h_0^{(m)} & \cdots & 0 \\ \vdots & \vdots & \ddots & \vdots & \vdots & \ddots & \vdots \\ 0 & 0 & \cdots & 0 & 0 & \cdots & h_0^{(m)} \end{bmatrix}^T \quad (4)$$

where $h_l^{(m)} = h_{lM+m}$, and $n_k^{(m)} = [n_{kM+m} \; n_{(k+1)M+m} \cdots n_{(k+N-1)M+m}]^T$.

Denoting by $w_k^{(m)} = [w_{kM+m} \; w_{(k+1)M+m} \cdots w_{(k+N-1)M+m}]^T$ the N-dimensional vector of the equalizer coefficients relative to the m-th subchannel, the equalizer output at time k can then be written as $$y_k = y(kT_c) = \sum_{\ell=0}^{MN-1} w_\ell r_{k-\ell} = w_k^{(0)T} r_k^{(0)} + \ldots + w_k^{(M-1)T} r_k^{(M-1)}. \quad (5)$$

Define the MN×1 vectors $w_k = [w_k^{(0)T} \ldots w_k^{(M-1)T}]^T$, $r_k = [r_k^{(0)T} \ldots w_k^{(M-1)T}]^T$, and $n_k = [n_k^{(0)T} \ldots n_k^{(M-1)T}]^T$, and introduce the MN×(N+L−1) channel matrix $H = [H^{(0)T} \ldots H^{(M-1)T}]^T$. With this notation, we have $$r_k = Hd_k + n_k \quad (6)$$

And the output of the chip-level channel equalizer results $$y_k = w_k^T r_k. \quad (7)$$

This signal is a composite chip rate sequence, which is then further processed to separately descramble and despread the data associated to the different downlink codes.

The above equalizer model corresponds to a Baud-spaced linear equalizer for M=1, and to a fractionally-spaced linear equalizer with $T_c/M$ spaced coefficients for M>1. Note that the model also formalizes the operation of a receive diversity equalizer, in the case where all or some of the M chip-rate subchannels correspond to the signal samples obtained from multiple receive antennas.

A common strategy for the computation of the MN equalizer coefficients of the vector $w_k$ is based on the minimization of the Mean-Square Error (MSE) at the equalizer output.

In the case of a block linear equalizer as described for example in [2], the optimum vector $W_{k(opt)}$ according to the Minimum Mean-Square Error (MMSE) criterion is obtained as $$w_{k(opt)} = \arg\min_{w_k} E\{|w_k^T r_k - d_{k+D}|^2\}, \quad (8)$$

where $E\{\cdot\}$ denotes statistical expectation and D is the overall delay at the equalizer output. From equation (8) straightforward calculation gives $$w_{k(opt)} = E\{r_k^* r_k^T\}^{-1} E\{r_k^* d_{k+D}\} = \left(H^* H^T + \frac{1}{\sigma_d^2} C_{nn}\right)^{-1} h_{k+D}^* \quad (9)$$

where $(\cdot)^*$ denotes complex conjugation, $\sigma_d^2 = E\{|d_k|^2\}$ is the variance of the transmitted composite chip sequence, $C_{nn} = E\{n_k^* n_k^T\}$ is the noise-plus-interference covariance matrix, and $h_{k+D}$ indicates the MN×1 column of the channel matrix H corresponding to the multiuser chip $d_{k+D}$.

The calculation of the optimum MMSE equalizer coefficients requires the availability of an estimate of the channel matrix H and of the noise covariance matrix $C_{nn}$. In a WCDMA receiver, channel estimation can be performed based on the downlink common pilot symbols in a manner know per se. For the calculation of the noise covariance matrix, denoting by G the receive filter matrix we have $$C_{nn} = \sigma_n^2 G^* G^T. \quad (10)$$

Since the receive filter is part of the receiver design, it is possible to precompute and store the matrix $G^*G^T$ to be used in (10). Note that, if the receive filter frequency response is the exact square root of a Nyquist filter response (i.e., of a filter response that satisfies the Nyquist criterion, then $G^*G^T = I$ and from (10) we have $C_{nn} = \sigma_n^2 I$.

Based on (10), equation (9) can be rewritten as $$w_{k(opt)} = \left(H^* H^T + \frac{\sigma_n^2}{\sigma_d^2} G^* G^T\right)^{-1} h_{k+D}^*. \quad (11)$$

After estimation of the channel response, the only additional parameter to be estimated in (11) is the ratio between the input intercell interference-plus-noise variance $\sigma_n^2$ and the composite chip sequence variance $\sigma_d^2$, which corresponds to the inverse of the cell geometry, estimated above.

In order to avoid the calculation of the matrix inverse required by (11), the computation of the equalizer coefficients may be alternatively performed in the frequency domain. Denote by $W_k$, $H_k$ and $N_k$, k=0, ..., $N_f$−1 the Fourier transform of the equalizer coefficients $w_l$, the sampled equivalent channel impulse response $h_l$ and the noise autocorrelation function, respectively. Then, for an MMSE frequency domain equalizer, one obtains the frequency domain equalizer coefficients $$W_{k(opt)} = \frac{H_k^*}{|H_k|^2 + \frac{1}{\sigma_d^2} N_k}, \quad (12)$$

as described for example in [10]. In this case, equalization of a block of data is performed by computing the Fourier transform of the received signal samples (1), multiplying the frequency domain signal by the frequency domain equalizer coefficients $W_k$, and finally computing the inverse Fourier transform of the resulting frequency domain equalized signal. The operations of Fourier transform and inverse Fourier transform can be efficiently implemented by means of $N_f$-point Fast Fourier Transform (FFT) and Inverse Fast Fourier Transform (IFFT).

If the interference-plus-noise samples at the input of the receive filter are modeled as a white Gaussian process with zero mean and variance $\sigma_n^2$, then denoting by $G_k$, k=0, ..., $N_f$−1 the Fourier transform of the sampled receive filter impulse response $g_l$, one has $$N_k = \sigma_n^2 |G_k|^2 \quad (13)$$

and (12) becomes $$W_{k(opt)} = \frac{H_k^*}{|H_k|^2 + \frac{\sigma_n^2}{\sigma_d^2} |G_k|^2}, \quad (14)$$

where $|G_k|^2 = 1$ for k=0, ..., $N_f$−1 if the receive filter impulse response is the exact square-root of a Nyquist filter response.

It is worth noting that in a CDMA system the quantity $\sigma_n^2/\sigma_d^2$ can vary over time—e.g., in the case of a mobile driving within the cell coverage area. Therefore, an up-to date estimate of the cell geometry is desirable to be able to accurately compute the coefficients of the chip-level MMSE equalizer coefficients. In the absence of a method for estimation of the quantity $\sigma_n^2/\sigma_d^2$, it would be necessary to use a fixed parameter, which will cause a degradation of the MSE performance at the output of the equalizer, depending on the deviation with respect to the actual value of $\sigma_n^2/\sigma_d^2$.

It will be appreciated that the implementing means discussed above, e.g., the determining means and the comparing means can be implemented in any suitable manner in hardware or software. In the latter case they can be implemented by executing in a processor code sequences shared in a memory.

What is claimed is:

1. A method of processing a signal received using a wireless communication channel by a receiver in a wireless cellular network, the method comprising:
   receiving signal samples of a signal to be processed from a serving cell;
   identifying a set of dominant interfering cells generating an interfering signal above a level;
   using a number of cells in the set to select an interference scenario; and
   using the selected interference scenario and at least one parameter related to the serving cell and the interfering cells to select a processing function for processing the signal.

2. A method according to claim 1, comprising:
   determining from the signal samples a serving cell power for the signal;
   determining the total interference power from the cells in the set, and
   comparing the ratio of the serving cell power and the total disturbance power with a threshold value defined by the selected interference scenario to select the processing function.

3. A method according to claim 2, wherein the threshold value varies with the number of dominant cells.

4. A method according to claim 1, wherein the processing function is an equalizer function.

5. A method according to claim 2, wherein the ratio is used to select an equalizer type in dependence on the threshold value.

6. A method according to claim 5, wherein the selection also depends from the value of at least one additional channel parameter.

7. A method according to claim 1, wherein the number of dominant cells is selected from a group of cells detected by a cell search function.

8. A method according to claim 5, wherein the equalizer type is selected from an Least Squares (LS) equalizer and an Minimum Mean-Square Error (MMSE) equalizer.

9. A method according to claim 1, wherein an equalizer parameter for the equalizer is determined based on at least one estimated channel condition.

10. A method according to claim 9, wherein the equalizer parameter is the time averaging interval.

11. A method according to claim 9, wherein the channel condition is an estimate of the relative mobile speed.

12. A computer program product comprising program code means stored on a non-transitory computer-readable medium which, when executed by a processor, implements a method according to claim 1.

13. A base station comprising a wireless interface for receiving and transmitting signals, said base station operable to implement a method according to claim 1.

14. A receiver for use in a wireless cellular network for processing digital samples, the receiver comprising:
   means for receiving signal samples;
   means for identifying a set of dominant interfering cells generating an interfering signal above a level;
   means for selecting an interference scenario using a number of cells in the set; and
   means for selecting a processing function for processing the digital samples based on the selected interference scenario and at least one parameter related to a serving cell and the interfering cells.

15. A receiver according to claim 14, further comprising a store holding a plurality of equalizer functions, wherein the selected interference scenario is used to select one of said equalizer functions as said processing function.

16. A receiver according to claim 14, comprising:
   means for determining from the signal samples a serving cell power for the signal;
   means for determining the total interference power from the cells in the set; and
   means for comparing the ratio of the serving cell power and the total disturbance power with a threshold value defined by the selected interference scenario to select the processing function.

17. A receiver according to claim 15, wherein the equalizer functions include Least Squares (LS) and Minimum Mean-Square Error (MMSE) equalizers.

18. A mobile terminal comprising a wireless interface for receiving signals and providing said signal samples to a receiver in accordance with claim 14.

19. A receiver for use in a wireless cellular network for processing digital samples, the receiver comprising:
   a processor arranged to receive a sequence of digital samples corresponding to symbols transmitted in a cell of the wireless network, and for implementing an interference scenario selection routine which uses an identified set of dominant interfering cells above signal level to select said interference scenario, said processor being further operable to implement one of a plurality of processing routines for processing the digital samples;
   a memory holding said plurality of processing routines;
   wherein the processor implements a selection routine which uses the selected interfering scenario to select one of the plurality of processing routines in the memory for processing the digital samples.

20. A method of processing digital samples in a cellular wireless network, the method comprising:
   receiving a sequence of samples corresponding to symbols transmitted in a signal in a cell of the wireless network;
   using said received sequence to generate an estimate of cell geometry, being an estimate of a ratio between received signal power of signals of that cell and disturbance power where disturbance power is a measure of disturbance introduced from signals of other cells and noise; and
   using said estimate to select one of a plurality of processing routines for processing the digital samples.

21. A method according to claim 20 comprising identifying a set of dominant interfering cells generating an interfering signal above a level; and
   determining the disturbance power from the cells in the set.

22. A method according to claim 21 wherein the number of cells in the set is used to select an interference scenario and comprising using the interference scenario and at least one additional parameter to select said processing routine.

23. A receiver for use in a wireless cellular network for processing digital samples, the receiver comprising:
- a processor arranged to receive a sequence of digital samples corresponding to symbols transmitted in a cell of the wireless network and for implementing an estimation routine which uses the received sequence to generate an estimate of a ratio between received signal power of signals of that cell and disturbance power where disturbance power is a measure of disturbance introduced from signals of other cells and noise, and one of a plurality of processing routines for processing the digital samples;
- a memory holding said plurality of processing routines;
- wherein the processing implements a routine which uses said estimate to select one of the plurality of processing routines in the memory for processing the digital samples.

24. A receiver according to claim 23, wherein the plurality of algorithms includes equalizer algorithms with different equalizer cost functions.

25. A receiver according to claim 24, wherein the cost functions are based on at least an Minimum Mean-Square Error (MMSE) criterion and a Least Squares (LS) criterion.

26. A method of processing radio communication signals in a radio receiver, the method comprising:
- receiving digital samples of an incoming radio communication signal and processing those samples in accordance with an equalizer algorithm;
- estimating at least one parameter of a channel over which the incoming signal has been transmitted;
- selecting said equalizer algorithm from a plurality of equalizer algorithms based on at least one said estimated channel parameter;
- wherein the plurality of equalizer algorithms include algorithms with different equalizer cost functions, and the step of selecting said equalizer algorithm comprises selecting one of said different equalizer cost functions; and
- wherein the step of selecting one of said equalizer cost functions is based on a parameter indicative of a signal to disturbance ratio.

27. A method of processing radio communication signals in a radio receiver, the method comprising:
- receiving digital samples of an incoming radio communication signal and processing those samples in accordance with an equalizer algorithm;
- estimating at least one parameter of a channel over which the incoming signal has been transmitted;
- selecting said equalizer algorithm from a plurality of equalizer algorithms based on at least one said estimated channel parameter;
- wherein the plurality of equalizer algorithms include algorithms with different equalizer cost functions, and the step of selecting said equalizer algorithm comprises selecting one of said different equalizer cost functions; and
- wherein the step of selecting one of said equalizer cost functions is based on a channel parameter indicative of statistical distribution of disturbance.

* * * * *